(12) United States Patent
Nakamura

(10) Patent No.: US 9,325,603 B2
(45) Date of Patent: Apr. 26, 2016

(54) NETWORK PERFORMANCE ESTIMATING APPARATUS AND NETWORK PERFORMANCE ESTIMATING METHOD, NETWORK CONFIGURATION CHECKING METHOD, COMMUNICATION MANAGING APPARATUS, AND DATA COMMUNICATION METHOD

(71) Applicant: Masato Nakamura, Tokyo (JP)

(72) Inventor: Masato Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/445,258

(22) Filed: Jul. 29, 2014

(65) Prior Publication Data

US 2014/0334313 A1 Nov. 13, 2014

Related U.S. Application Data

(62) Division of application No. 13/496,441, filed as application No. PCT/JP2010/065254 on Sep. 6, 2010, now Pat. No. 9,009,284.

(30) Foreign Application Priority Data

Sep. 25, 2009 (JP) ................................. 2009-220496

(51) Int. Cl.
*H04L 12/26* (2006.01)
*H04L 12/24* (2006.01)
(Continued)

(52) U.S. Cl.
CPC ............ *H04L 43/50* (2013.01); *H04L 12/2602* (2013.01); *H04L 12/407* (2013.01);
(Continued)

(58) Field of Classification Search
CPC ..... H04L 41/0866; H04L 41/14; H04L 43/00; H04L 12/2602; H04L 12/40019; H04L 12/4035; H04L 12/407; H04L 12/417; H04L 43/50
See application file for complete search history.

(56) References Cited

U.S. PATENT DOCUMENTS 4,747,100 A * 5/1988 Roach et al. .................. 370/452
5,444,695 A * 8/1995 Copley et al. ................ 370/452
(Continued)

FOREIGN PATENT DOCUMENTS

JP 02-050541 A 2/1990
JP 5-250296 A 9/1993
(Continued)

OTHER PUBLICATIONS

Dennis S. Mok, "A graphical simulation software for predicting IEEE802.5 token-ring performances." Proceedings of the 20th Annual Symposium on Simulation; ANSS '87; IEEE Computer Society Press Los Alamitos; 1987; (14 pages total).*
(Continued)

*Primary Examiner* — Michael C Lai
(74) *Attorney, Agent, or Firm* — Sughrue Mion, PLLC; Richard C. Turner

(57) ABSTRACT

A network performance estimating apparatus includes a network-configuration depicting unit configured to generate, from a designed network, network configuration information indicating a connection relation of ports among communication apparatuses and store, as attribute information, apparatus identification information including input peculiar information for each communication apparatus name and apparatus type of the communication apparatuses, a communication-apparatus-attribute-information acquiring unit configured to acquire, communication performance of the communication apparatuses specified by the apparatus identification information from peculiar information in which apparatus model names and communication performance are stored in association with each other, a token-circulation-order determining unit configured to determine, from the network configuration information, token circulation order indicating order in a designed network, and a performance estimating unit configured to calculate communication performance of the designed network using the token circulation order and the communication performance of the communication apparatuses.

11 Claims, 41 Drawing Sheets

(51) Int. Cl.
*H04L 12/40* (2006.01)
*H04L 12/403* (2006.01)
*H04L 12/417* (2006.01)
*H04L 12/407* (2006.01)

(52) U.S. Cl.
CPC ...... *H04L12/40019* (2013.01); *H04L 12/4035* (2013.01); *H04L 12/417* (2013.01); *H04L 41/0866* (2013.01); *H04L 43/00* (2013.01)

(56) References Cited

U.S. PATENT DOCUMENTS

| | | | | |
|---|---|---|---|---|
| 5,734,824 | A * | 3/1998 | Choi | 709/224 |
| 7,218,663 | B1 * | 5/2007 | Yokota et al. | 375/130 |
| 7,821,968 | B2 | 10/2010 | Keeni et al. | |
| 2001/0044844 | A1 * | 11/2001 | Takei | 709/224 |
| 2006/0146694 | A1 | 7/2006 | Hamaguchi et al. | |
| 2009/0028067 | A1 | 1/2009 | Keeni et al. | |
| 2012/0099480 | A1 * | 4/2012 | Nakamura et al. | 370/255 |
| 2013/0148496 | A1 * | 6/2013 | Nakamura et al. | 370/225 |

FOREIGN PATENT DOCUMENTS

| | | |
|---|---|---|
| JP | 06-120968 A | 4/1994 |
| JP | 10-23050 A | 1/1998 |
| JP | 11-220482 A | 8/1999 |
| JP | 2000-267710 A | 9/2000 |
| JP | 2000-311186 A | 11/2000 |
| JP | 2001-326641 A | 11/2001 |
| JP | 2003-318900 A | 11/2003 |
| JP | 2006-174157 A | 6/2006 |
| JP | 2006-302297 A | 11/2006 |
| JP | 4019616 B2 | 12/2007 |
| WO | 2006-118203 A1 | 11/2006 |

OTHER PUBLICATIONS

Japanese Office Action (Notice of Rejection) mailed Mar. 18, 2014, Application No. 2013-005603.
Japanese Office Action (Notice of Rejection) mailed Nov. 19, 2013, Application No. 2013-005603.
Dennis S. Mok, "A graphical simulation software for predicting IEEE802.5 token-ring performances." Proceedings of the 20th Annual Symposium on Simulation; ANSS '87; IEEE Computer Society Press Los Alamitos; 1987; (14 pages total).
Stephan Willmanns, "Simulation von Token-Ring and FDDI". Seminar paper, Lehrstuhl f.r Praktische Informatik IV, Universit.t Mannheim, Aug. 1998, (18 pages total) URL, http://pi4.informatik.um-mannheim.de/pi4.data/content/animations/fddi/fddithesis.html#_Toc433114019.
Communication dated Oct. 7, 2015, issued by the German Patent Office in counterpart German Application No. 112010003776.0.

* cited by examiner

FIG.1

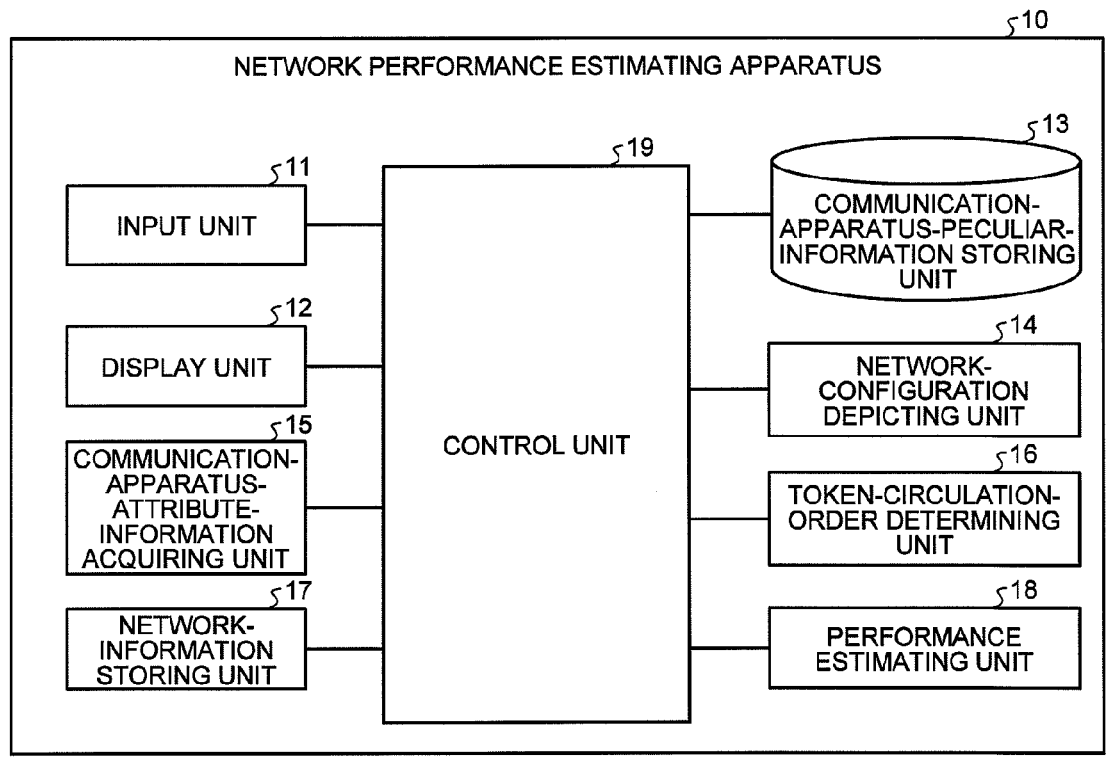

NETWORK PERFORMANCE ESTIMATING APPARATUS (10)
- 11 INPUT UNIT
- 12 DISPLAY UNIT
- 15 COMMUNICATION-APPARATUS-ATTRIBUTE-INFORMATION ACQUIRING UNIT
- 17 NETWORK-INFORMATION STORING UNIT
- 19 CONTROL UNIT
- 13 COMMUNICATION-APPARATUS-PECULIAR-INFORMATION STORING UNIT
- 14 NETWORK-CONFIGURATION DEPICTING UNIT
- 16 TOKEN-CIRCULATION-ORDER DETERMINING UNIT
- 18 PERFORMANCE ESTIMATING UNIT

FIG.2

| APPARATUS MODEL NAME | APPARATUS MANUFACTURER | APPARATUS TYPE | TOKEN HOLD TIME | DELAY TIME |
|---|---|---|---|---|
| ABCD_X | COMPANY A | SLAVE STATION | 50 μsec | |
| XXX_1 | COMPANY B | SLAVE STATION | 20 μsec | |
| YYY_2 | COMPANY B | SLAVE STATION | 30 μsec | |
| PPP1 | COMPANY C | SLAVE STATION | 40 μsec | |
| PQR1 | COMPANY C | SLAVE STATION | 30 μsec | |
| ABC_HUB | COMPANY B | HUB | | 10 μsec |
| DEF_HUB | COMPANY A | HUB | | 20 μsec |
| AAA_1 | COMPANY A | MASTER STATION | | |
| | | | | |

| APPARATUS NAME | APPARATUS MANUFAC-TURER | APPARATUS TYPE | APPARATUS MODEL NAME | TOKEN HOLD TIME | DELAY TIME | |
|---|---|---|---|---|---|---|
| MASTER STATION X | COMPANY A | MASTER STATION | AAA_1 | | | ⌐401 |
| SLAVE STATION A | COMPANY B | SLAVE STATION | XXX_1 | | | ⌐402 |
| SLAVE STATION B | COMPANY B | SLAVE STATION | YYY_2 | | | |
| SLAVE STATION C | COMPANY A | SLAVE STATION | ABCD_X | | | |
| HUB H | COMPANY B | HUB | ABC_HUB | | | |
| | | | | | | |

FIG.5

| HOST APPARATUS NAME | HOST APPARATUS PORT | SUBORDINATE APPARATUS NAME | SUBORDINATE APPARATUS PORT | |
|---|---|---|---|---|
| MASTER STATION X | X1 | HUB H | H1 | ⌒501 |
| HUB H | H2 | SLAVE STATION A | A1 | ⌒502 |
| HUB H | H3 | SLAVE STATION B | B1 | ⌒503 |
| HUB H | H4 | SLAVE STATION C | C1 | ⌒504 |
| | | | | |

FIG.6

| APPARATUS NAME | APPARATUS MANUFAC-TURER | APPARATUS TYPE | APPARATUS MODEL NAME | TOKEN HOLD TIME | DELAY TIME | |
|---|---|---|---|---|---|---|
| MASTER STATION X | COMPANY A | MASTER STATION | AAA_1 | | | |
| SLAVE STATION A | COMPANY B | SLAVE STATION | XXX_1 | 20 μ sec | | ⌐601 |
| SLAVE STATION B | COMPANY B | SLAVE STATION | YYY_2 | 30 μ sec | | |
| SLAVE STATION C | COMPANY A | SLAVE STATION | ABCD_X | 50 μ sec | | |
| HUB H | COMPANY B | HUB | ABC_HUB | | 10 μ sec | |
| | | | | | | |

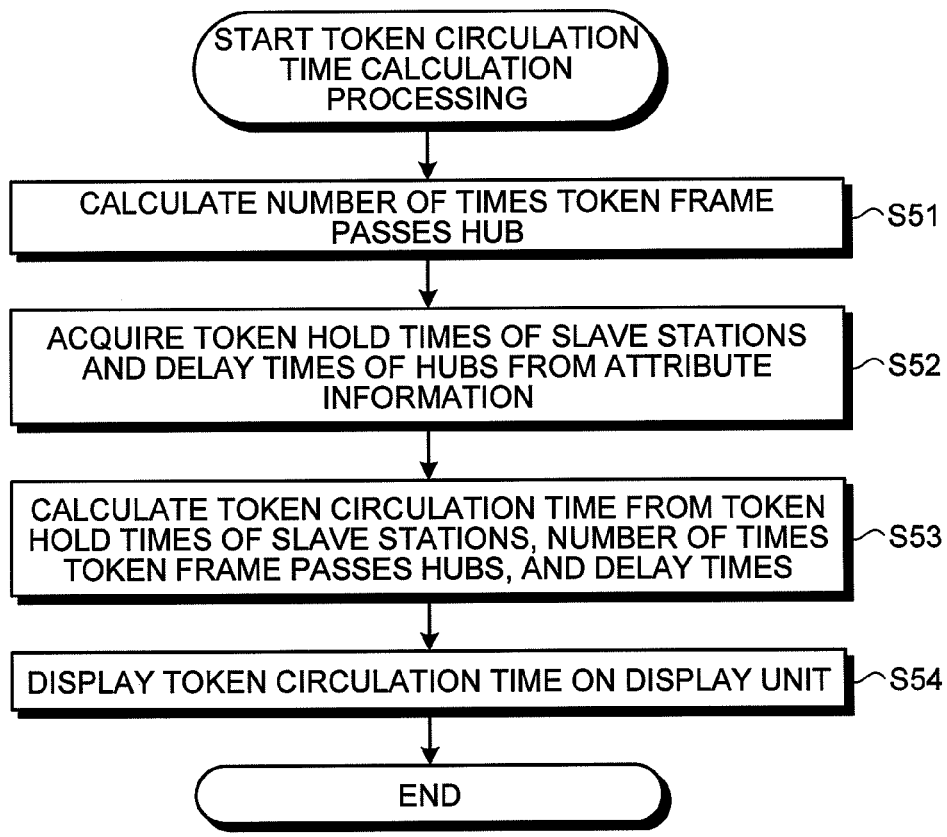

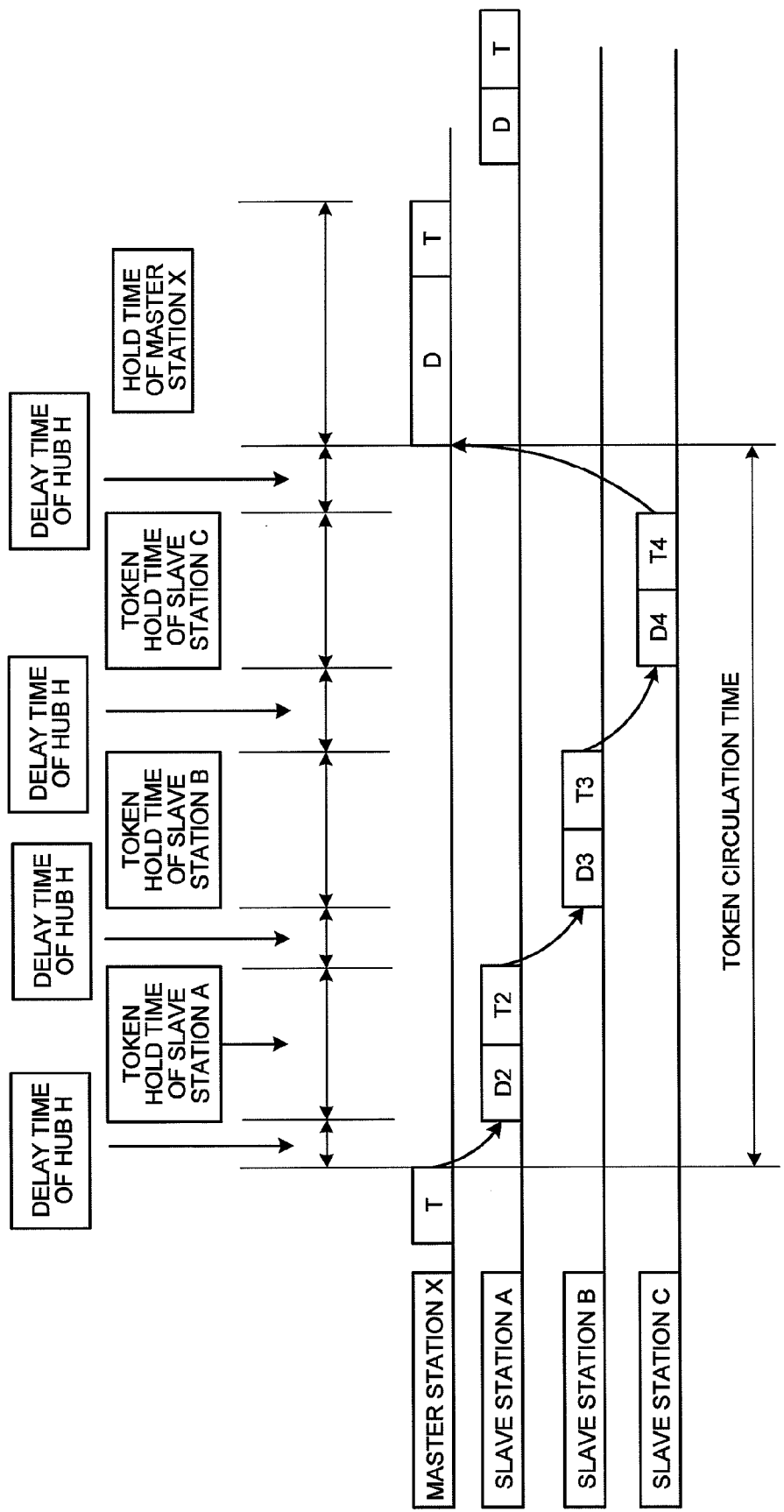

FIG.12

| APPARATUS MODEL NAME | APPARATUS MANUFAC-TURER | APPARATUS TYPE | TOKEN HOLD TIME | DELAY TIME | INPUT DATA AMOUNT | OUTPUT DATA AMOUNT | INPUT THROUGHPUT | OUTPUT THROUGHPUT |
|---|---|---|---|---|---|---|---|---|
| ABCD_X | COMPANY A | SLAVE STATION | 50 μ sec | | 100bytes | 100bytes | | |
| XXX_1 | COMPANY B | SLAVE STATION | 20 μ sec | | 1,000bytes | 1,000bytes | | |
| YYY_2 | COMPANY B | SLAVE STATION | 30 μ sec | | 400bytes | 400bytes | | |
| PPP1 | COMPANY C | SLAVE STATION | 40 μ sec | | 500bytes | 500bytes | | |
| PQR1 | COMPANY C | SLAVE STATION | 30 μ sec | | 300bytes | 300bytes | | |
| ABC_HUB | COMPANY B | HUB | | 10 μ sec | | | | |
| DEF_HUB | COMPANY A | HUB | | 20 μ sec | | | | |
| AAA_1 | COMPANY A | MASTER STATION | | | | | 50nsec/byte | 40nsec/byte |
| | | | | | | | | |

FIG. 13

| APPARATUS NAME | APPARATUS MANUFAC- TURER | APPARATUS TYPE | APPARATUS MODEL NAME | TOKEN HOLD TIME | DELAY TIME | INPUT DATA AMOUNT | OUTPUT DATA AMOUNT | INPUT THROUGHPUT | OUTPUT THROUGHPUT |
|---|---|---|---|---|---|---|---|---|---|
| MASTER STATION X | COMPANY A | MASTER STATION | AAA_1 | | | | | 50nse/byte | 40nsec/byte |
| SLAVE STATION A | COMPANY B | SLAVE STATION | XXX_1 | 20 μsec | | 100bytes | 100bytes | | |
| SLAVE STATION B | COMPANY B | SLAVE STATION | YYY_2 | 30 μsec | | 1,000bytes | 1,000bytes | | |
| SLAVE STATION C | COMPANY A | SLAVE STATION | ABCD_X | 50 μsec | | 400bytes | 400bytes | | |
| HUB H | COMPANY B | HUB | ABC_HUB | | 10 μsec | | | | |
| | | | | | | | | | |

| APPARATUS NAME | INPUT DATA AMOUNT | OUTPUT DATA AMOUNT |
|---|---|---|
| SLAVE STATION A | 100bytes | 100bytes |
| SLAVE STATION B | 1,000bytes | 1,000bytes |
| SLAVE STATION C | 400bytes | 400bytes |
| TOTAL | 1,500bytes | 1,500bytes |

FIG.16

| APPARATUS NAME | APPARATUS MANUFAC- TURER | APPARATUS TYPE | APPARATUS MODEL NAME | TOKEN HOLD TIME | DELAY TIME | INPUT DATA AMOUNT | OUTPUT DATA AMOUNT | SET INPUT DATA AMOUNT | SET OUTPUT DATA AMOUNT |
|---|---|---|---|---|---|---|---|---|---|
| MASTER STATION X | COMPANY A | MASTER STATION | AAA_1 | | | | | | |
| SLAVE STATION A | COMPANY B | SLAVE STATION | XXX_1 | 20 μ sec | | 100bytes | 100bytes | 50bytes | 75bytes |
| SLAVE STATION B | COMPANY B | SLAVE STATION | YYY_2 | 30 μ sec | | 1,000bytes | 1,000bytes | 200bytes | 250bytes |
| SLAVE STATION C | COMPANY A | SLAVE STATION | ABCD_X | 50 μ sec | | 400bytes | 400bytes | 300bytes | 350bytes |
| HUB H | COMPANY B | HUB | ABC_HUB | | 10 μ sec | | | | |
| | | | | | | | | | |

|  | SLAVE STATION A | SLAVE STATION B | SLAVE STATION C |
|---|---|---|---|
| TOKEN HOLD TIME | 20 $\mu$ sec | 30 $\mu$ sec | 50 $\mu$ sec |
| INPUT DATA AMOUNT | 100bytes | 1,000bytes | 400bytes |
| OUTPUT DATA AMOUNT | 100bytes | 1,000bytes | 400bytes |

FIG.19

|  | SLAVE STATION A | SLAVE STATION B | SLAVE STATION C |
|---|---|---|---|
| SET INPUT DATA AMOUNT | 50bytes | 200bytes | 300bytes |
| SET OUTPUT DATA AMOUNT | 75bytes | 250bytes | 350bytes |

FIG.27

| NETWORK PRESENCE CHECK FRAME | DA | SA | type | FRAME IDENTIFICATION INFORMATION | MAC ADDRESS INFORMATION OF MASTER STATION | TRANSMISSION PORT INFORMATION OF NETWORK PRESENCE CHECK FRAME OF OWN STATION |
|---|---|---|---|---|---|---|
| TestDataFrame (X1→all) | F | 100 | ** | TestData | 100 | X1 |

| NETWORK PRESENCE CHECK RESPONSE FRAME | DA | SA | type | FRAME IDENTIFICATION INFORMATION | SA INFORMATION IN RECEIVED NETWORK PRESENCE CHECK FRAME | PORT INFORMATION OF STATION THAT TRANSMITTED NETWORK PRESENCE CHECK FRAME | PORT INFORMATION OF OWN STATION THAT RECEIVED NETWORK PRESENCE CHECK FRAME | OWN APPARATUS INFORMATION |
|---|---|---|---|---|---|---|---|---|
| TestDataACKFrame (A1→X) | 100 | 1 | ** | TestData ACK | 100 | X1 | A1 | XXX_1, COMPANY B |
| TestDataACKFrame (B1→X) | 100 | 2 | ** | TestData ACK | 100 | X1 | B1 | YYY_2, COMPANY B |
| TestDataACKFrame (C1→X) | 100 | 3 | ** | TestData ACK | 100 | X1 | C1 | ABCD_X, COMPANY A |

| SA | SA INFORMATION IN RECEIVED NETWORK PRESENCE CHECK FRAME | PORT INFORMATION OF STATION THAT TRANSMITTED NETWORK PRESENCE CHECK FRAME | PORT INFORMATION OF OWN STATION THAT RECEIVED NETWORK PRESENCE CHECK FRAME | |
|---|---|---|---|---|
| 1 | 100 | X1 | A1 | ~2901 |
| 2 | 100 | X1 | B1 | ~2902 |
| 3 | 100 | X1 | C1 | |

FIG.31

| MAC ADDRESS OF FIRST COMMUNICATION APPARATUS | PORT OF FIRST COMMUNICATION APPARATUS | MAC ADDRESS OF SECOND COMMUNICATION APPARATUS | PORT OF SECOND COMMUNICATION APPARATUS | |
|---|---|---|---|---|
| 1 | A1 | 100 | X1 | ～3101 |
| 2 | B1 | 100 | X1 | ～3102 |
| 3 | C1 | 100 | X1 | ～3103 |
|  |  |  |  | |

FIG.33

| HOST APPARATUS NAME | HOST APPARATUS MODEL NAME | HOST APPARATUS MANUFAC- TURER | HOST APPARATUS PORT | SUBORDINATE APPARATUS NAME | SUBORDINATE APPARATUS MODEL NAME | SUBORDINATE APPARATUS MANUFAC- TURER | SUBORDI- NATE APPARATUS PORT |
|---|---|---|---|---|---|---|---|
| MASTER STATION X | | | X1 | SLAVE STATION A | | | A1 |
| MASTER STATION X | | | X1 | SLAVE STATION B | | | B1 |
| MASTER STATION X | | | X1 | SLAVE STATION C | | | C1 |
| SLAVE STATION A | | | A1 | SLAVE STATION B | | | B1 |
| SLAVE STATION A | | | A1 | SLAVE STATION C | | | C1 |
| SLAVE STATION B | | | B1 | SLAVE STATION C | | | C1 |

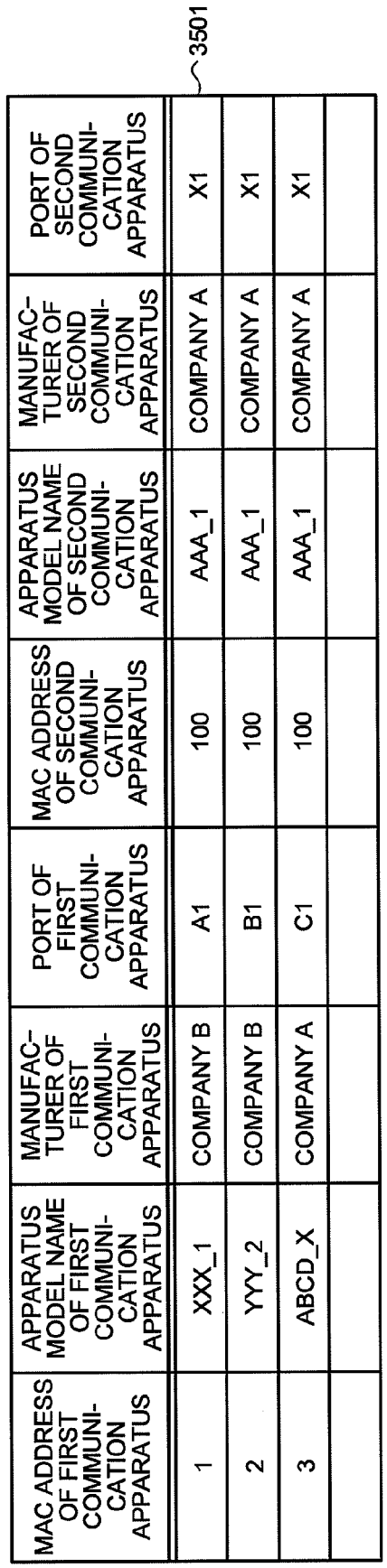

| MAC ADDRESS OF FIRST COMMUNI- CATION APPARATUS | APPARATUS MODEL NAME OF FIRST COMMUNI- CATION APPARATUS | MANUFAC- TURER OF FIRST COMMUNI- CATION APPARATUS | PORT OF FIRST COMMUNI- CATION APPARATUS | MAC ADDRESS OF SECOND COMMUNI- CATION APPARATUS | APPARATUS MODEL NAME OF SECOND COMMUNI- CATION APPARATUS | MANUFAC- TURER OF SECOND COMMUNI- CATION APPARATUS | PORT OF SECOND COMMUNI- CATION APPARATUS |
|---|---|---|---|---|---|---|---|
| 1 | XXX_1 | COMPANY B | A1 | 100 | AAA_1 | COMPANY A | X1 |
| 2 | YYY_2 | COMPANY B | B1 | 100 | AAA_1 | COMPANY A | X1 |
| 3 | ABCD_X | COMPANY A | C1 | 100 | AAA_1 | COMPANY A | X1 |
| | | | | | | | |
| | | | | | | | |

| NETWORK PRESENCE CHECK FRAME | DA | SA | type | FRAME IDENTI- FICATION INFOR- MATION | MAC ADDRESS INFORMATION OF MASTER STATION | TRANSMISSION PORT INFORMATION OF NETWORK PRESENCE CHECK FRAME OF OWN STATION | |
|---|---|---|---|---|---|---|---|
| TestDataFrame (X1→all) | F | 100 | ** | TestData | 100 | X1 | ~3701 |
| TestDataFrame (C2→all) | F | 3 | ** | TestData | 100 | C2 | ~3702 |

FIG.38

| NETWORK PRESENCE CHECK RESPONSE FRAME | DA | SA | type | FRAME IDENTI- FICATION INFOR- MATION | SA INFORMATION IN RECEIVED NETWORK PRESENCE CHECK FRAME | PORT INFORMATION OF STATION THAT TRANSMITTED NETWORK PRESENCE CHECK FRAME | PORT INFORMATION OF OWN STATION THAT RECEIVED NETWORK PRESENCE CHECK FRAME | OWN APPARATUS INFORMATION | |
|---|---|---|---|---|---|---|---|---|---|
| TestDataACKFrame (A1→X) | 100 | 1 | ** | TestData ACK | 100 | X1 | A1 | XXX_1, COMPANY B | ～3801 |
| TestDataACKFrame (B1→X) | 100 | 2 | ** | TestData ACK | 100 | X1 | B1 | YYY_2, COMPANY B | ～3802 |
| TestDataACKFrame (C1→X) | 100 | 3 | ** | TestData ACK | 100 | X1 | C1 | ABCD_X, COMPANY A | ～3803 |
| TestDataACKFrame (D1→X) | 100 | 4 | ** | TestData ACK | 3 | C2 | D1 | ABCD_X, COMPANY A | ～3804 |

FIG.39

| SA | SA INFORMATION IN RECEIVED NETWORK PRESENCE CHECK FRAME | PORT INFORMATION OF STATION THAT TRANSMITTED NETWORK PRESENCE CHECK FRAME | PORT INFORMATION OF OWN STATION THAT RECEIVED NETWORK PRESENCE CHECK FRAME |
|---|---|---|---|
| 1 | 100 | X1 | A1 |
| 2 | 100 | X1 | B1 |
| 3 | 100 | X1 | C1 |
| 4 | 3 | C2 | D1 |

~3901

| MAC ADDRESS OF FIRST COMMUNICATION APPARATUS | PORT OF FIRST COMMUNICATION APPARATUS | MAC ADDRESS OF SECOND COMMUNICATION APPARATUS | PORT OF SECOND COMMUNICATION APPARATUS | |
|---|---|---|---|---|
| 1 | A1 | 100 | X1 | |
| 2 | B1 | 100 | X1 | |
| 3 | C1 | 100 | X1 | |
| 4 | D1 | 3 | C2 | ~4104 |
| | | | | |

FIG.42

| MAC ADDRESS | APPARATUS MODEL NAME | APPARATUS MANUFACTURER | |
|---|---|---|---|
| 100 | AAA_1 | COMPANY A | |
| 1 | XXX_1 | COMPANY B | |
| 2 | YYY_2 | COMPANY B | |
| 3 | ABCD_X | COMPANY A | |
| 4 | ABCD_X | COMPANY A | ~4205 |
|  |  |  | |

FIG.43

| HOST APPARATUS NAME | HOST APPARATUS PORT | SUBORDINATE APPARATUS NAME | SUBORDINATE APPARATUS PORT | |
|---|---|---|---|---|
| MASTER STATION X | X1 | HUB H | H1 | |
| HUB H | H2 | SLAVE STATION A | A1 | |
| HUB H | H3 | SLAVE STATION B | B1 | |
| HUB H | H4 | SLAVE STATION C | C1 | |
| SLAVE STATION C | C2 | SLAVE STATION D | D1 | ~4305 |
|  |  |  |  | |

FIG.44

| HOST APPARATUS NAME | HOST APPARATUS MODEL NAME | HOST APPARATUS MANUFACTURER | HOST APPARATUS PORT | SUBORDINATE APPARATUS NAME | SUBORDINATE APPARATUS MODEL NAME | SUBORDINATE APPARATUS MANUFACTURER | SUBORDINATE APPARATUS PORT |
|---|---|---|---|---|---|---|---|
| MASTER STATION X | | | X1 | SLAVE STATION A | | | A1 |
| MASTER STATION X | | | X1 | SLAVE STATION B | | | B1 |
| MASTER STATION X | | | X1 | SLAVE STATION C | | | C1 |
| SLAVE STATION A | | | A1 | SLAVE STATION B | | | B1 |
| SLAVE STATION A | | | A1 | SLAVE STATION C | | | C1 |
| SLAVE STATION B | | | B1 | SLAVE STATION C | | | C1 |
| SLAVE STATION C | | | C2 | SLAVE STATION D | | | D1 |

| HOST APPARATUS NAME | HOST APPARATUS MODEL NAME | HOST APPARATUS MANUFACTURER | HOST APPARATUS PORT | SUBORDINATE APPARATUS NAME | SUBORDINATE APPARATUS MODEL NAME | SUBORDINATE APPARATUS MANUFACTURER | SUBORDINATE APPARATUS PORT |
|---|---|---|---|---|---|---|---|
| MASTER STATION X | AAA_1 | COMPANY A | X1 | SLAVE STATION A | ABCD_X | COMPANY A | A1 |
| MASTER STATION X | AAA_1 | COMPANY A | X1 | SLAVE STATION B | XXX_1 | COMPANY B | B1 |
| MASTER STATION X | AAA_1 | COMPANY A | X1 | SLAVE STATION C | ABCD_X | COMPANY A | C1 |
| SLAVE STATION A | XXX_1 | COMPANY B | A1 | SLAVE STATION B | YYY_2 | COMPANY B | B1 |
| SLAVE STATION A | XXX_1 | COMPANY B | A1 | SLAVE STATION C | ABCD_X | COMPANY A | C1 |
| SLAVE STATION B | YYY_2 | COMPANY B | B1 | SLAVE STATION C | ABCD_X | COMPANY A | C1 |
| SLAVE STATION C | ABCD_X | COMPANY A | C2 | SLAVE STATION D | ABCD_X | COMPANY A | D1 |

FIG.46

| MAC ADDRESS OF FIRST COMMUNI-CATION APPARATUS | APPARATUS MODEL NAME OF FIRST COMMUNI-CATION APPARATUS | MANUFAC-TURER OF FIRST COMMUNI-CATION APPARATUS | PORT OF FIRST COMMUNI-CATION APPARATUS | MAC ADDRESS OF SECOND COMMUNI-CATION APPARATUS | APPARATUS MODEL NAME OF SECOND COMMUNI-CATION APPARATUS | MANUFAC-TURER OF SECOND COMMUNI-CATION APPARATUS | PORT OF SECOND COMMUNI-CATION APPARATUS |
|---|---|---|---|---|---|---|---|
| 1 | XXX_1 | COMPANY B | A1 | 100 | AAA_1 | COMPANY A | X1 |
| 2 | YYY_2 | COMPANY B | B1 | 100 | AAA_1 | COMPANY A | X1 |
| 3 | ABCD_X | COMPANY A | C1 | 100 | AAA_1 | COMPANY A | X1 |
| 4 | ABCD_X | COMPANY A | D1 | 3 | ABCD_X | COMPANY A | C2 |
|   |   |   |   |   |   |   |   |

4604

US 9,325,603 B2

NETWORK PERFORMANCE ESTIMATING APPARATUS AND NETWORK PERFORMANCE ESTIMATING METHOD, NETWORK CONFIGURATION CHECKING METHOD, COMMUNICATION MANAGING APPARATUS, AND DATA COMMUNICATION METHOD

CROSS REFERENCE TO RELATED APPLICATIONS

This is a divisional application of Ser. No. 13/496,441, now U.S. Pat. No. 9,009,284, filed Mar. 15, 2012, which is a National Stage of International Application No. PCT/JP2010/065254, filed on Sep. 6, 2010, which claims priority from Japanese Patent Application No. 2009-220496, filed on Sep. 25, 2009, the contents of all of which are incorporated herein by reference in their entirety.

FIELD

The present invention relates to a network performance estimating apparatus and a network performance estimating method for performing estimation of performance in a network that performs communication using a token frame among communication apparatuses. The present invention relates to a network configuration checking method for comparing a network designed by estimating performance and the configuration of a constructed network. Further, the present invention relates to a communication managing apparatus and a data communication method used in a network for which estimation of network performance is performed.

BACKGROUND

An FA (Factory Automation) system includes control target apparatuses and a control apparatus such as a programmable controller that performs predetermined arithmetic processing using states of the control target apparatuses as input data and outputs operation conditions of the control target apparatuses as output data. Communication means are provided in the control apparatus and the control target apparatuses and connected via a network, whereby real-time control is enabled. Specifically, the communication means provided in the control target apparatuses are caused to function as slave stations. The communication means provided in the control apparatus is caused to function as a communication management station that controls data transmission by the slave stations. The communication management station periodically performs processing for receiving data from the slave stations, calculating, using the received data, data for controlling the control target apparatuses, and transmitting the data to the slave stations. In performing the processing, the communication management station controls timing of the data transmission by the slave stations to guarantee real-time properties of the data communication.

A method of estimating performance of the network in such an FA system in which the communication management station and the slave stations are connected via the network is proposed (see, for example, Patent Literature 1). Patent Literature 1 discloses a network configuration managing tool including collecting means for collecting, in an actual network, peculiar information of the slave stations such as IDs and input and output sizes, table creating means for creating, based on the collected peculiar information, a parameter table that is information concerning a network configuration used in a master station, and download means for downloading the created parameter table to the master station. The network configuration managing tool is connected to the FA system. The parameter table is automatically generated by the network configuration managing tool and generated information is registered in the master station.

CITATION LIST

Patent Literature

Patent Literature 1: Japanese Patent Application Laid-open No. 2002-084295

SUMMARY

Technical Problem

However, Patent Literature 1 adopts a system in which the communication management station and the slave stations are actually connected to the network and the network configuration managing tool collects information held by the connected slave stations and estimates performance. There is a problem in that performance cannot be estimated unless the apparatuses are actually connected. In other words, it is meaningless for a purchaser if the estimation of the network performance is acquired after the network is constructed. It is desirable to perform the estimation at a stage before purchase.

In Patent Literature 1, as information for calculating a performance formula, performance is calculated using only information concerning a data size of each of the salve stations. Connection information of the network such as connection of a hub is not taken into account. Therefore, there is also a problem in that, in a network connected via a plurality of hubs, accurate performance cannot be estimated. As explained above, in the FA network requested to have real-time properties, it is necessary to complete transmission and reception of data within a predetermined time. Therefore, it is desirable that network performance can be accurately estimated before purchase.

Further, an apparatus that determines whether a designed network configuration and an actually-constructed network configuration coincide with each other is not proposed in the past. A method of grasping a connection relation including a port in a constructed network is not proposed in the past either.

The present invention has been devised in view of the above and it is an object of the present invention to obtain a network performance estimating apparatus and a network performance estimating method that can accurately estimate network performance at a stage before purchase. It is an object of the present invention to obtain a network performance estimating apparatus and a network configuration checking method that can determine whether a designed network configuration and a network configuration actually constructed based on design coincide with each other. Further, it is an object of the present invention to obtain a communication managing apparatus and a data communication method that can grasp, in comparing a constructed network with a designed network, a connection state of communication apparatuses in the constructed network.

Solution to Problem

In order to solve the aforementioned problems and attain the aforementioned object, a network performance estimating apparatus according to one aspect of the present invention is constructed in such a manner that it includes: a network-configuration depicting unit configured to generate, from a network designed by a user by connecting ports of a plurality of communication apparatuses with wires, network configuration information indicating a connection relation of the ports among the communication apparatuses and store, concerning the communication apparatuses in the designed network, as attribute information, apparatus identification information including peculiar information for each communication apparatus name and apparatus type of the communication apparatuses input by the user; a communication-apparatus-attribute-information acquiring unit configured to acquire, concerning the communication apparatuses in the attribute information, communication performance of the communication apparatuses specified by the apparatus identification information from communication apparatus peculiar information in which the peculiar information and communication performance for each apparatus type are stored in association with each other concerning the communication apparatuses; a token-circulation-order determining unit configured to determine, from the network configuration information, token circulation order indicating order of the communication apparatuses in which a token frame is circulated in the designed network; and a performance estimating unit configured to calculate communication performance of the designed network using the token circulation order and the communication performance of the communication apparatuses.

Advantageous Effects of Invention

According to the present invention, at a stage before purchase, concerning a network that a purchaser intends to assemble, a communication managing apparatus and slave stations are selected and a hub is selected according to necessity and the network performance is calculated based on apparatus configurations of the communication management station and the salve stations. Therefore, there is an effect that the network performance can be accurately estimated. There is also an effect that a connection state (port connection information) of an actually-constructed network can be recognized and measures against an abnormal place of the network are quickly taken.

BRIEF DESCRIPTION OF DRAWINGS

FIG. 1 is a schematic block diagram of the configuration of a network performance estimating apparatus according to a first embodiment of the present invention.

FIG. 2 is a table of an example of peculiar information of a communication apparatus.

FIG. 4 is a table of an example of attribute information.

FIG. 5 is a table of an example of network configuration information.

FIG. 6 is a table of an example of attribute information.

FIG. 9-1 is a (first) schematic diagram of an example of a process for creating a token circulation table.

FIG. 9-2 is a (second) schematic diagram of the example of the process for creating a token circulation table.

FIG. 9-3 is a (third) schematic diagram of the example of the process for creating a token circulation table.

FIG. 9-4 is a (fourth) schematic diagram of the example for creating a token circulation table.

FIG. 9-5 is a (fifth) schematic diagram of the example of the process for creating a token circulation table.

FIG. 10 is a flowchart for explaining an example of a procedure of token circulation time calculation processing according to the first embodiment.

FIG. 11 is a schematic diagram of an example of a method of calculating a token circulation time according to the first embodiment.

FIG. 12 is a table of an example of peculiar information of a communication apparatus.

FIG. 13 is a table of an example of attribute information.

FIG. 16 is a table of an example of attribute information.

FIG. 19 is a table of an example of set input data amounts and set output data amounts of the slave stations.

FIG. 23-1 is a schematic block diagram of a functional configuration of a master station.

FIG. 23-2 is a schematic block diagram of a functional configuration of a slave station.

FIG. 24-1 is a diagram of an example of a format of a network presence check frame.

FIG. 24-2 is a diagram of an example of a format of a network presence check response frame.

FIG. 27 is a diagram of an example of a network presence check frame.

FIG. 28 is a diagram of an example of the network presence check response frame.

FIG. 29 is a diagram of an example of network presence information generated by the master station.

FIG. 30-1 is a (first) schematic diagram of an example of a procedure of a method of generating network connection information.

FIG. 30-2 is a (second) schematic diagram of the example of the procedure of the method of generating network connection information.

FIG. 30-3 is a (third) schematic diagram of the example of the procedure of the method of generating network connection information.

FIG. 31 is a table of an example of network connection information.

FIG. 33 is a table of an example of design data connection relation information.

FIG. 35 is a table of an example of real machine connection relation information.

FIG. 37 is a diagram of an example of network presence check frames.

FIG. 38 is a diagram of an example of network presence check response frames.

FIG. 39 is a table of an example of network presence information generated by the master station.

FIG. 42 is a table of an example of apparatus information.

FIG. 43 is a table of an example of network configuration information.

FIG. 44 is a table of an example of design data connection relation information.

FIG. 45 is a table of the example of the design data connection relation information.

FIG. 46 is a table of an example of real machine connection relation information.

DESCRIPTION OF EMBODIMENTS

A network performance estimating apparatus and a network performance estimating method, a network configuration checking method, a communication managing apparatus, and a data communication method according to embodiments of the present invention are explained in detail with reference to the accompanying drawings. In the following explanation, estimation of network performance performed in a communication system in which one master station and one or more slave stations are connected to a network, a token frame is circulated in a predetermined order among these communication apparatuses, and the communication apparatus that has acquired the token frame performs transmission of data is explained. However, the present invention is not limited by the embodiments.

First Embodiment

Figures 1, 9:

FIG. 1 is a schematic block diagram of the configuration of a network performance estimating apparatus according to a first embodiment of the present invention. A network performance estimating apparatus 10 includes an input unit 11, a display unit 12, a communication-apparatus-peculiar-information storing unit 13, a network-configuration depicting unit 14, a communication-apparatus-attribute-information acquiring unit 15, a token-circulation-order determining unit 16, a network-information storing unit 17, a performance estimating unit 18, and a control unit 19 that controls these processing units.

The input unit 11 is an interface between the network performance estimating apparatus 10 and a user of the network performance estimating apparatus 10. The input unit 11 includes input devices such as a keyboard and a mouse. Communication apparatuses such as a master station functioning as a communication management station, slave stations, and a switching hub (hereinafter also referred to as hub) included in an FA network are arranged and wires that connect the communication apparatuses are set via the input unit 11. The display unit 12 includes a display device such as a liquid crystal display device that displays information necessary for the user.

Figures 2, 9:
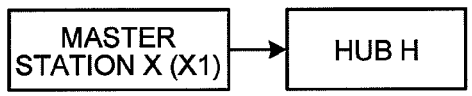
Figures 3, 9:
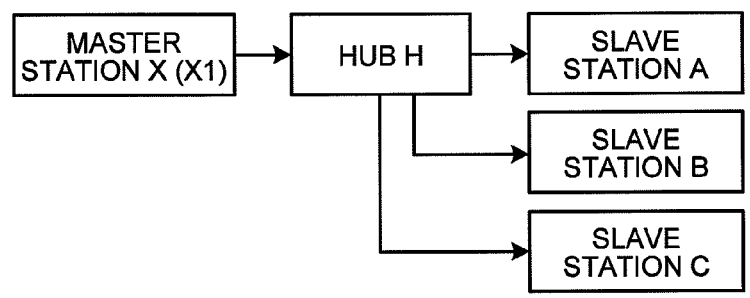

The communication-apparatus-peculiar-information storing unit 13 stores peculiar information including apparatus type information such as apparatus model names of the communication apparatuses and performance information of the communication apparatuses. FIG. 2 is a table of an example of the peculiar information of the communication apparatuses. The peculiar information of the communication apparatuses includes "apparatus model name" indicating a model of a communication apparatus, "apparatus manufacturer" indicating a manufacturing company, "apparatus type" indicating a type, "token hold time" indicating a holding time for a token frame when the apparatus type is a slave station, and "delay time" indicating a delay time of a frame when the apparatus type is a hub. The "apparatus type" indicates types of communication apparatuses such as a master station, a slave station, and a hub. The "token hold time" is a numerical value indicating performance that takes into account hardware processing and firmware processing. As the peculiar information of the communication apparatuses, peculiar information of communication apparatuses provided from an organization of open network connection apparatus manufacturing partner manufacturers established for spreading open networks can be used.

The network-configuration depicting unit 14 has a function of supporting depiction of a network configuration by the user. For example, the network-configuration depicting unit 14 provides the user with a graphical interface such that the communication apparatuses and wires can be arbitrarily arranged within a display screen of the display unit 12. The network-configuration depicting unit 14 also has a function of storing a network configuration set by the user in the network-information storing unit 17 as network configuration information.

Figure 3:
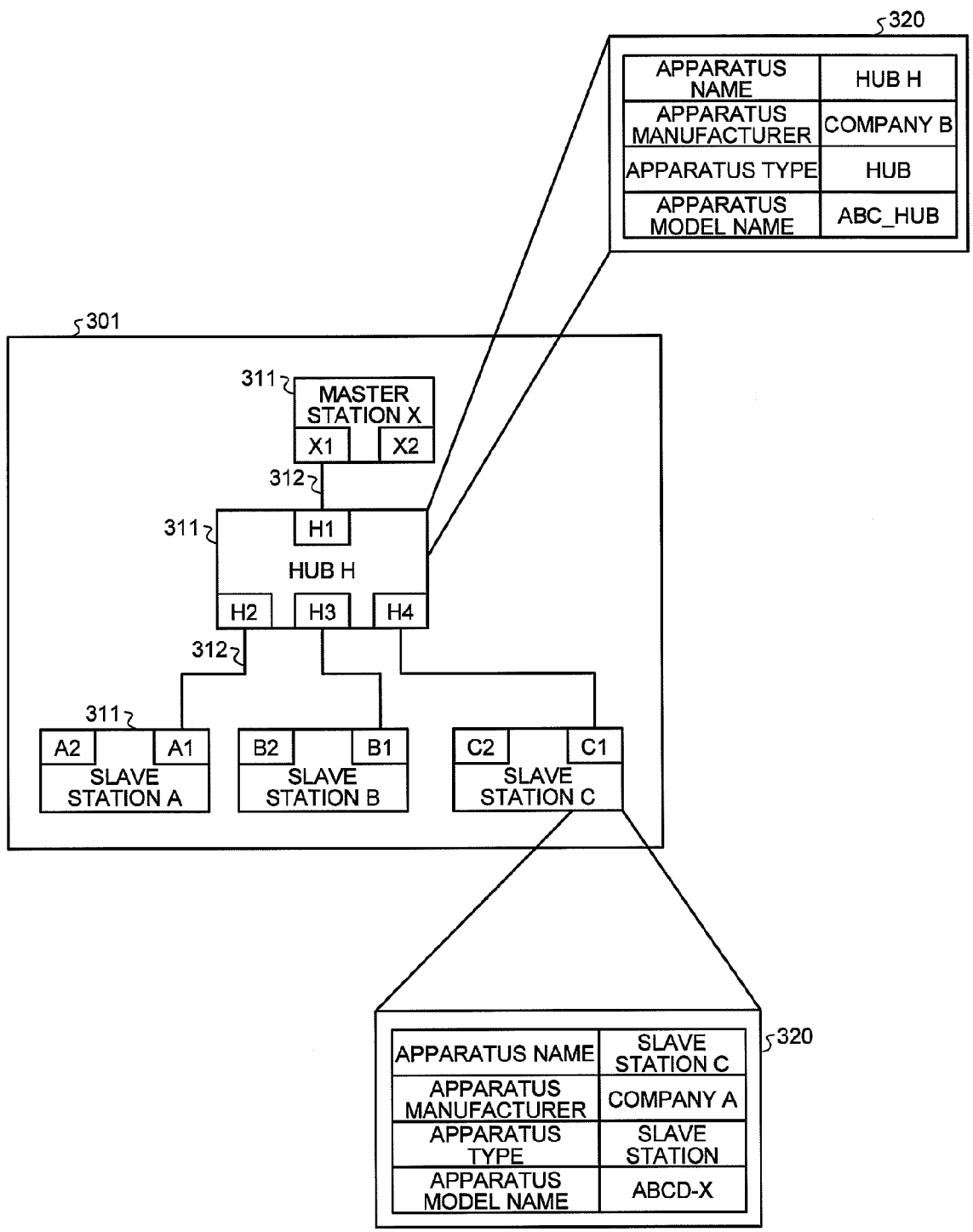
FIG. 3 is a schematic diagram of an example of a display screen of a network configuration.

FIG. 3 is a schematic diagram of an example of a display screen for a network configuration. As shown in the figure, communication apparatus models 311 formed by rectangular figures indicating communication apparatuses such as a master station, slave stations, and a hub and wires 312 that connect the communication apparatus models 311 are prepared in a display screen 301. In the following explanation, it is assumed that the master station and the slave stations are communication apparatuses each including two ports and the hub is a communication apparatus including a plurality of ports. The user arranges the communication apparatus models 311 on the display screen 301 from the input unit 11 and connects the ports provided on the communication apparatus models 311 using the wires 312. In each of the communication apparatus models 311, an attribute information input form 320 is provided to which attribute information including "apparatus name" for uniquely identifying a communication apparatus on the network, "apparatus manufacture", "apparatus type", and "apparatus model name" can be input.

Figures 4, 9:
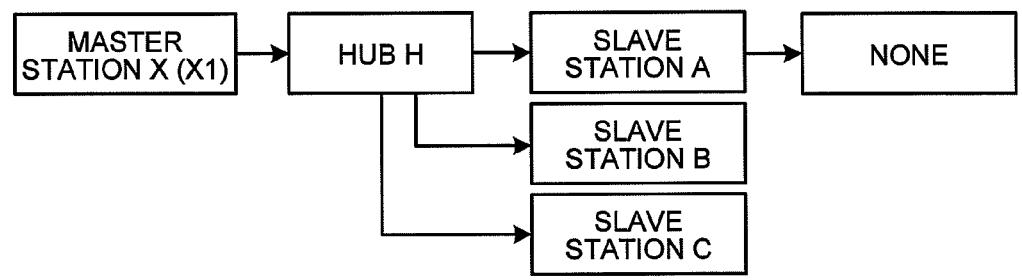

The attribute information input to the attribute information input form 320 via the input unit 11 is stored in the network-information storing unit 17 as attribute information associated with the communication apparatuses of the network configuration information. FIG. 4 is a table of an example of the attribute information. The attribute information includes "apparatus name", "apparatus manufacturer", "apparatus type", "apparatus model name", "token hold time", and "delay time". The item of "apparatus name" is a name uniquely given to a communication apparatus. The items of "apparatus manufacturer" and "apparatus type" are attribute information of the communication apparatus input by the user. For example, items input on the screen shown in FIG. 3 are directly stored in the items corresponding thereto. The "token hold time" is an item in which, when the "apparatus type" is "slave station", a token hold time in the slave station is stored. The "delay time" is an item in which, when the "apparatus type" is "hub", a delay time in the hub is stored. The "token hold time" and the "delay time" are acquired from the peculiar information of the communication-apparatus-peculiar-information storing unit 13 by the communication-apparatus-attribute-information acquiring unit 15. The "apparatus name", the "apparatus manufacturer", the "apparatus type", and the "apparatus model name" correspond to apparatus identification information. The "token hold time" and the "delay time" correspond to communication performance. In this example, a communication apparatus is specified by the "apparatus manufacturer", the "apparatus type", and the "apparatus model name" in the apparatus identification information. However, for example, if apparatus model names do not overlap among different apparatus manufactures, the apparatus identification information can also be formed only by the "apparatus model name" and the "apparatus name".

The network-configuration depicting unit 14 grasps a connection relation among set figures (communication apparatuses) and stores the connection relation in the network-information storing unit 17 as network configuration information. For example, the network-configuration depicting unit 14 can grasp, from a positional relation between the figures 311 indicating communication apparatus model drawn by the user and the wires 312, as to which ports of the communication apparatus and which ports of the other communication apparatuses are connected. Therefore, the connection relation can be set as the network configuration information. As shown in FIG. 3, one master station X and three slave stations A to C are connected in a star shape via a hub H. Specifically, a port X1 of the master station X and a port H1 of the hub H are connected by the wire 312. A port H2 of the hub H and a port A1 of the slave station A are connected by the wire 312. A port H3 of the hub H and a port B1 of the slave station B are connected by the wire 312. A port H4 of the hub H and a port C1 of the slave station C are connected by the wire 312.

Figures 5, 9:
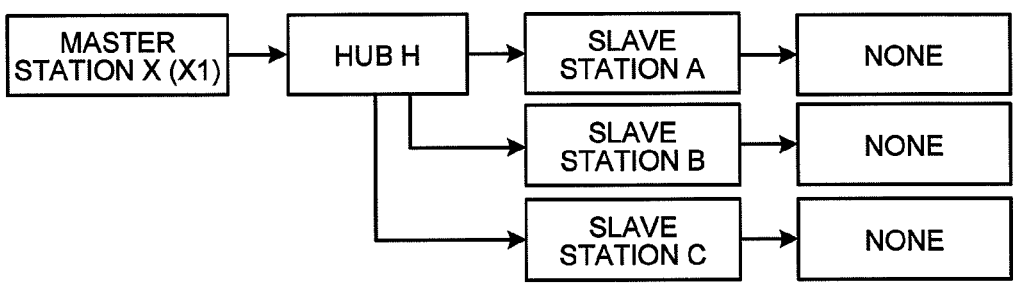

FIG. 5 is a table of an example of the network configuration information. As shown in the figure, the network configuration information indicates a connection relation between ports of two communication apparatuses connected by a wire. "Host apparatus name" and "host apparatus port" representing an apparatus name concerning one communication apparatus and a port of the one communication apparatus and "subordinate apparatus name" and "subordinate apparatus port" representing an apparatus name concerning the other communication apparatus and a port of the other communication apparatus are associated with each other. In FIG. 5, connection relations concerning the network shown in FIG. 3 are shown.

As "host" and "subordinate", the communication apparatus closer to the master station in the connection relation between the two communication apparatuses is "host" and the communication apparatus farther from the master station in the connection relation is "subordinate". However, the "host" and the "subordinate" are for convenience for explanation. This does not mean that records always have to be stored in the network configuration information according to the relation between the "host" and the "subordinate" explained above.

The communication-apparatus-attribute-information acquiring unit 15 acquires, concerning the communication apparatuses, token hold times or delay times corresponding to input attribute information from the communication-apparatus-peculiar-information storing unit 13.

Specifically, concerning the slave stations, the communication-apparatus-attribute-information acquiring unit 15 searches, from the peculiar information in the communication-apparatus-peculiar-information storing unit 13, records coinciding with the "apparatus manufacturer", the "apparatus type", and the "apparatus model name" in the attribute information stored in the network-information storing unit 17, and acquires the "token hold time" in the records. Concerning the hub, the communication-apparatus-attribute-information acquiring unit 15 searches, from the peculiar information in the communication-apparatus-peculiar-information storing unit 13, records coinciding with the "apparatus manufacturer", the "apparatus type", and the "apparatus model name" in the attribute information and acquires the "delay time" in the records. The communication-apparatus-attribute-information acquiring unit 15 stores the acquired "token hold time" or "delay time" in items corresponding to the communication apparatuses in the attribute information. FIG. 6 is a table of an example of the attribute information. In FIG. 6, a state in which the "token hold time" or the "delay time" is acquired concerning the records shown in FIG. 4 is shown.

The token-circulation-order determining unit 16 determines, using the network configuration information stored in the network-information storing unit 17, token circulation order in a network (a communication system) set by the user. The token-circulation-order determining unit 16 determines, using a connection relation among communication apparatuses specified from the network configuration information, token circulation order such that the number of communication apparatuses that a token frame passes in one circulation is minimized (that is, when a wire connecting two communication apparatuses (including a hub) is called transmission line, the number of transmission lines through which the token frame passes in one circulation is minimized). As a method of determining circulation order of the token frame that satisfies such a condition, in a network belonging to the same segment, when communication apparatuses connected under a master station are expanded in a tree shape, the communication apparatuses connected in the tree shape only have to be connected to be selected in order of turning around the tree from the master station, i.e., in a method of drawing in a single stroke. Processing for determining token circulation order using the method of drawing in a single stroke is explained later. The determined token circulation order is stored in the network-information storing unit 17 as token circulation order information.

The network-information storing unit 17 stores network configuration information, for example, shown in FIG. 5, indicating a connection relation among communication apparatuses set by the user, attribute information, for example, shown in FIG. 6, concerning the communication apparatuses in the network configuration information, and token circulation order information in a designed network. The network configuration information, the attribute information, and the token circulation order information are stored in association with one another. As the network configuration information, the arrangement diagram of the communication apparatuses input by the user shown in FIG. 3 can be stored.

The performance estimating unit 18 calculates, using the token circulation information stored in the network-information storing unit 17 and token hold times in the communication apparatuses, a token circulation time in the network set by the user. Specifically, the token circulation time can be calculated as a sum of token hold times of slave stations present in the network and a product of the number of times a token frame passes the hub, which is calculated from the token circulation order, and a delay time of the hub. The performance estimating unit 18 also performs processing for displaying the calculated token circulation time on the display unit 12.

A processing procedure of a network performance estimating method according to the first embodiment is explained below in order. In the following explanation, as an example, the network performance estimating apparatus 10 includes the network configuration shown in FIG. 3 and has the network configuration information shown in FIG. 5 and the attribute information shown in FIG. 4

<Processing for Acquiring Attribute Information of Communication Apparatuses>

Figure 7:
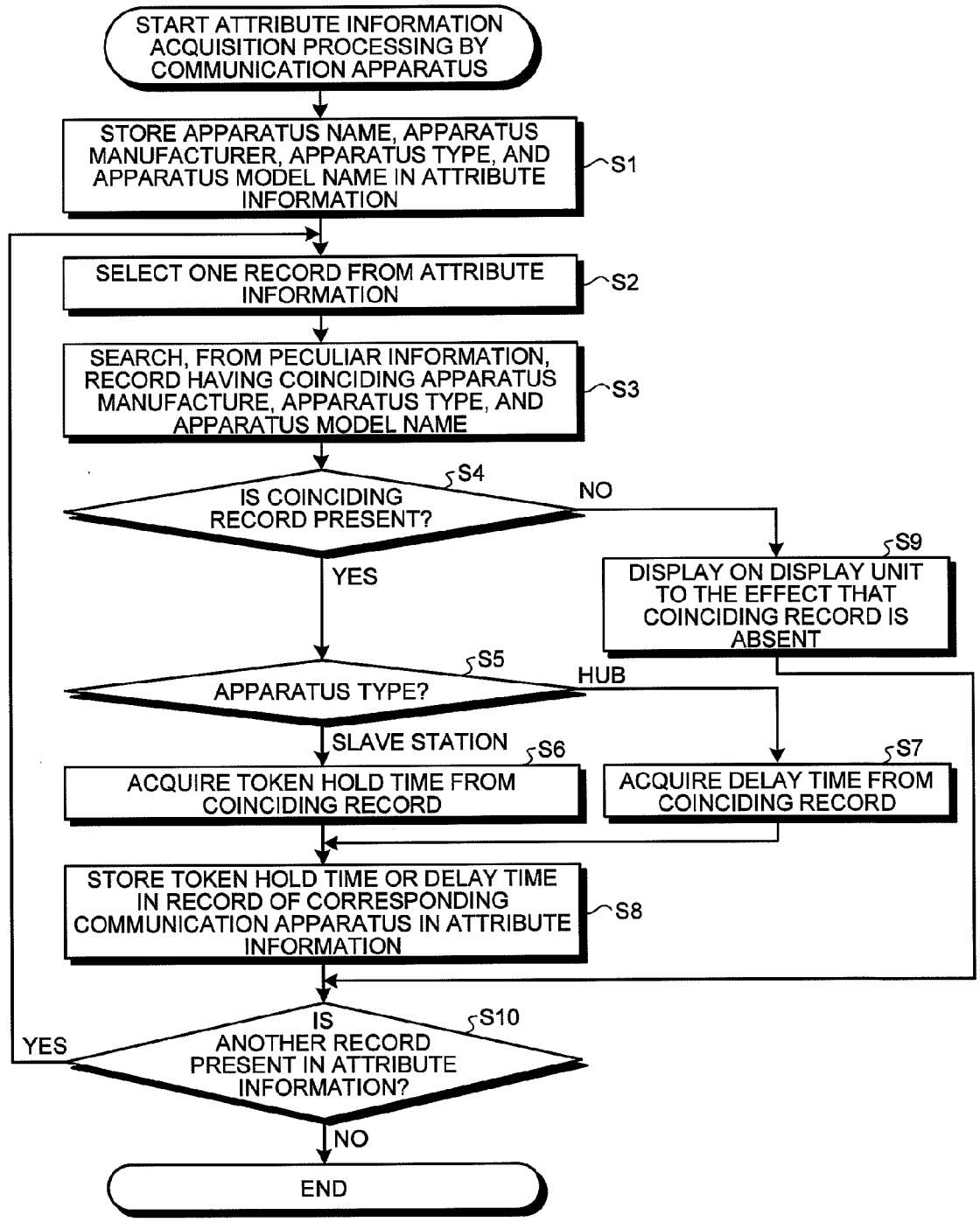
FIG. 7 is a flowchart for explaining an example of processing for acquiring attribute information of a communication apparatus according to a first embodiment.

FIG. 7 is a flowchart for explaining an example of processing for acquiring attribute information of communication apparatuses according to the first embodiment. First, when input of attribute information including "apparatus name", "apparatus manufacture", "apparatus type", and "apparatus model name" by the user to the attribute information input form of communication apparatuses included in a network is completed and the attribute information is stored in the "attribute information" in the network-information storing unit 17 (step S1), the communication-apparatus-attribute-information acquiring unit 15 selects one record from the attribute information in the network-information storing unit 17 (step S2). The communication-apparatus-attribute-information acquiring unit 15 performs a search from the peculiar information in the communication-apparatus-peculiar-information storing unit 13 using "apparatus manufacturer", "apparatus type", and "apparatus model name" of the record as keys (step S3). The communication-apparatus-attribute-information acquiring unit 15 determines whether a record coinciding with a combination of the "apparatus manufacturer", the "apparatus type", and the "apparatus model name" is present (step S4).

As a result of the search, when a record coinciding with the combination of the "apparatus manufacturer", the "apparatus type", and the "apparatus model name" is present (Yes at step S4), the communication-apparatus-attribute-information acquiring unit 15 determines the apparatus type (step S5). When the apparatus type is a slave station (in the case of a slave station at step S5), the communication-apparatus-attribute-information acquiring unit 15 acquires a token hold time from the record (step S6). When the apparatus type is a hub (in the case of a hub at step S5), the communication-apparatus-attribute-information acquiring unit 15 acquires a delay time from the record (step S7).

Thereafter, the communication-apparatus-attribute-information acquiring unit 15 stores the acquired token hold time or delay time in a record of a corresponding communication apparatus in the attribute information of the network-information storing unit 17 (step S8).

As a result of the search at step S4, when a record coinciding with the combination of the "apparatus manufacturer", the "apparatus type", and the "apparatus model name" is absent (No at step S4), the communication-apparatus-attribute-information acquiring unit 15 displays on the display unit 12 that there is no corresponding record (step S9).

Thereafter or after step S8, the communication-apparatus-attribute-information acquiring unit 15 checks whether another record from which a token hold time or a delay time is not acquired is present in the attribute information (step S10). When another record is present (Yes at step S10), the communication-apparatus-attribute-information acquiring unit 15 returns to step S2. When another record is absent (No at step S10), the processing for acquiring attribute information of communication apparatuses ends.

Specific processing for acquiring the attribute information of the communication apparatuses shown in FIG. 6 is explained with reference to the network shown in FIG. 3 as an example. In FIG. 4, attribute information immediately after being input by the user is shown. As shown in the figure, concerning the master station X, the slave stations A to C, and the hub H, contents are input to only attribute information of "apparatus name", "apparatus manufacturer", and "apparatus type" input by the user.

The communication-apparatus-attribute-information acquiring unit 15 searches, from the peculiar information shown in FIG. 2 in the communication-apparatus-peculiar-information storing unit 13, a record in which, for example, concerning "slave station A" of a record 601, the apparatus manufacturer is "company B", the apparatus type is "slave station", and the apparatus model name is "XXX_1". As a result, a record 201 in the peculiar information shown in FIG. 2 corresponds to the record. The communication-apparatus-attribute-information acquiring unit 15 acquires a token hold time "20 μsec" of the record 201 and writes the token hold time in the item of "token hold time" of the record of the slave station A in the attribute information shown in FIG. 4. Concerning records specified by other "apparatus name", "token hold time" and "delay time" are written by the same method. As a result, attribute information shown in FIG. 6 is obtained.

<Token Circulation Order Determination Processing>

Figure 8:
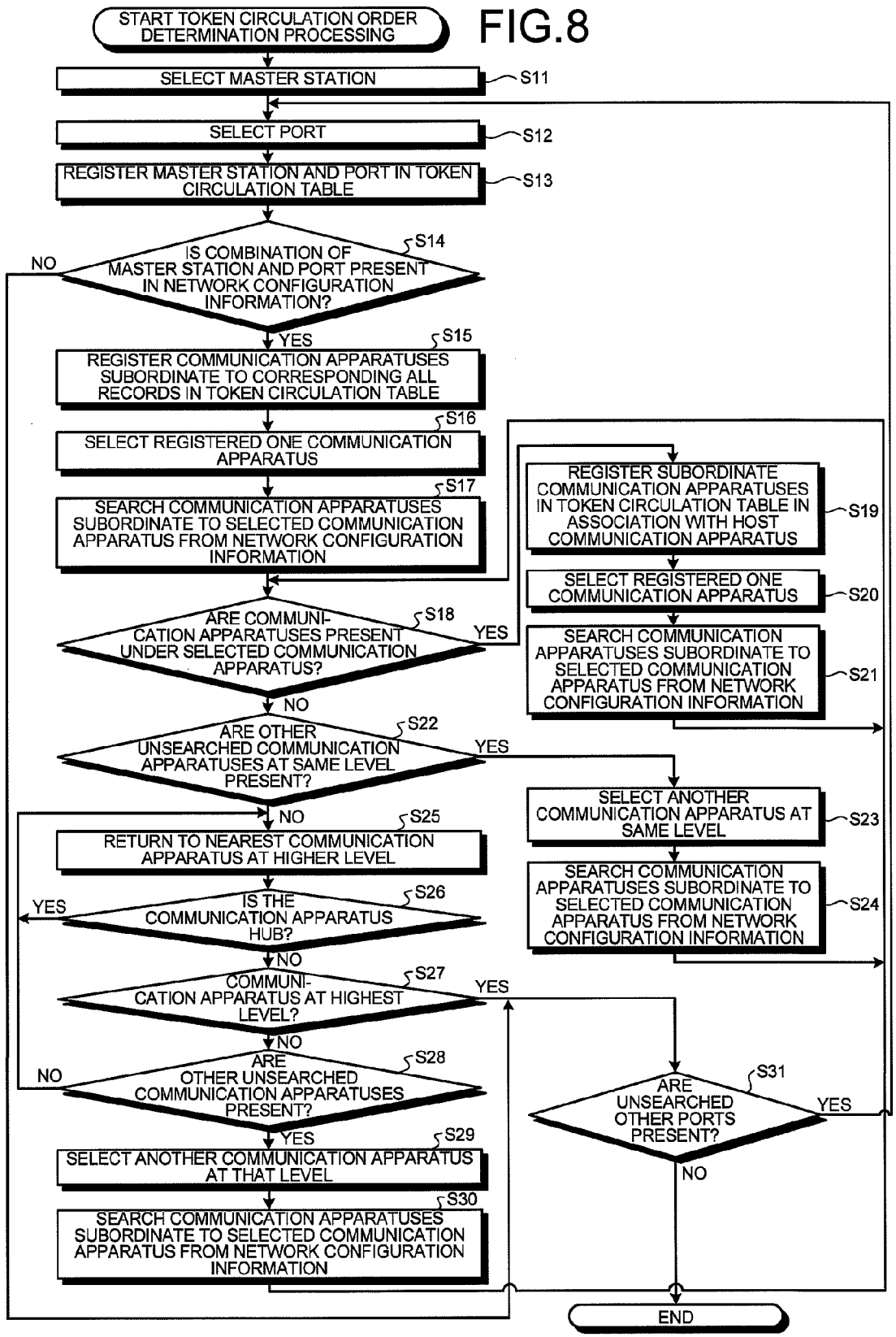
FIG. 8 is a flowchart for explaining an example of processing for determining token circulation order according to the first embodiment.

FIG. 8 is a flowchart for explaining an example of processing for determining token circulation order according to the first embodiment. First, the token-circulation-order determining unit 16 selects the own station, i.e., the master station as an apparatus name, (step S11). The token-circulation-order determining unit 16 selects one port among ports of the own station as a port (step S12). The token-circulation-order determining unit 16 registers a combination of the selected apparatus name and the selected port of the own station in a token circulation table serving as token circulation order information (step S13).

Subsequently, the token-circulation-order determining unit 16 performs, in order, a search to find whether records of a combination of "host apparatus name" and "host apparatus port" same as the combination of the selected apparatus name and the selected port of the own station are present in the network configuration information in the network-information storing unit 17 (step S14). As a result of the search, when records of the same combination are present (Yes at step S14), the token-circulation-order determining unit 16 registers "subordinate apparatus name" included in the corresponding all records in the token circulation table to connect subordinate apparatuses to the port of the master station X registered at step S13 (step S15).

Thereafter, the token-circulation-order determining unit 16 selects one communication apparatus (apparatus name) among the communication apparatuses (apparatus names) registered in the token circulation table (step S16). Subsequently, the token-circulation-order determining unit 16 searches through, in order, the network configuration information to find whether a record having the same "host apparatus name" as the apparatus name of the selected communication apparatus is present, i.e., whether a communication apparatus subordinate to the selected communication apparatus is present (step S17).

The token-circulation-order determining unit 16 determines whether communication apparatuses are present under a communication apparatus corresponding to the apparatus name of the selected communication apparatus (step S18). When communication apparatuses are present under the selected communication apparatus (Yes at step S18), the token-circulation-order determining unit 16 registers "apparatus name" of communication apparatuses of records corresponding to the subordinate communication apparatuses in the token circulation table so as to be connected to "apparatus name" of the communication apparatus (a slave station or the hub) selected at step S16 (step S19).

Subsequently, the token-circulation-order determining unit 16 selects one communication apparatus among the communication apparatuses registered at step S19 (step S20). The token-circulation-order determining unit 16 searches through, in order, the network configuration information to find whether records having "host apparatus name" same as the selected communication apparatus are present, i.e., whether communication apparatuses subordinate to the selected communication apparatus are present (step S21). Thereafter, the token-circulation-order determining unit 16 returns to step S18. The processing at steps S18 to S21 is repeatedly performed until the processing reaches a communication apparatus at the bottom in one branch selected out of branches branching in order from the master station in a network configuration of a tree shape.

When the processing reaches a communication apparatus at the bottom of a certain branch in the network configuration of the tree shape, a subordinate communication apparatus is absent in processing for searching for a communication apparatus subordinate to the selected communication apparatus at step S21. Therefore, when a communication apparatus is absent under the selected communication apparatus at step S18 (No at step S18), the processing shifts.

In this case, the token-circulation-order determining unit 16 determines whether other unsearched communication apparatuses at the same level as a communication apparatus selected last at step S16 or S20 are present (step S22). The level refers to the number of communication apparatuses in a path reaching from the master station to a certain communication apparatus when communication apparatuses are connected in a tree shape from the master station.

When other unsearched communication apparatuses at the same level as the communication apparatus selected last are present (Yes at step S22), the token-circulation-order determining unit 16 selects another communication apparatus registered in the token circulation table at the same level as the communication apparatus selected last (step S23). Subsequently, the token-circulation-order determining unit 16 searches through, in order, the network configuration information to find whether a record having "host apparatus name" same as the selected communication apparatus is present, i.e., whether a communication apparatus subordinate to the selected communication apparatus is present (step S24). Thereafter, the token-circulation-order determining unit 16 returns to step S18.

On the other hand, when other unsearched communication apparatuses at the same level as the communication apparatus selected last are absent (No at step S22), the token-circulation-order determining unit 16 returns to a nearest communication apparatus at a higher level of the communication apparatus selected last (step S25). The token-circulation-order determining unit 16 determines whether the communication apparatus at the higher level to which the token-circulation-order determining unit 16 returns is a hub (step S26). When the communication apparatus to which the token-circulation-order determining unit 16 returns is a hub (Yes at step S26), the token-circulation-order determining unit 16 returns to step S25. When the communication apparatus to which the token-circulation-order determining unit 16 returns is not a hub (No at step S26), the token-circulation-order determining unit 16 determines whether the communication apparatus to which the token-circulation-order determining unit 16 returns is a communication apparatus at the highest level, i.e., whether the communication apparatus is the master station (step S27). When the communication apparatus to which the token-circulation-order determining unit 16 returns is not the communication apparatus at the highest level (No at step S27), the token-circulation-order determining unit 16 determines whether unsearched communication apparatuses registered in the token circulation table at the same level as the communication apparatus to which the token-circulation-order determining unit 16 returns are present (step S28).

When unsearched communication apparatuses registered in the token circulation table at the same level as the communication apparatus to which the token-circulation-order determining unit 16 returns are present (Yes at step S28), the token-circulation-order determining unit 16 selects unsearched another communication apparatus registered in the token circulation table at the same level as the communication apparatus to which the token-circulation-order determining unit 16 returns (step S29). Subsequently, the token-circulation-order determining unit 16 searches through, in order, the network configuration information to find whether a record having "host apparatus name" same as the selected communication apparatus is present, i.e., whether a communication apparatus subordinate to the selected communication apparatus is present (step S30). Thereafter, the token-circulation-order determining unit 16 returns to step S18.

When unsearched communication apparatuses registered in the token circulation table at the same level as the communication apparatus to which the token-circulation-order determining unit 16 returns are absent at step S28 (No at step S28), the token-circulation-order determining unit 16 returns to step S25.

By executing the processing explained above, all communication apparatuses connected to the port selected at step S12 of the master station selected at step S11 are extracted in a tree shape.

Further, when a record of the combination of "host apparatus name" and "host apparatus port" same as the combination of the selected master station and the selected port is absent in the network configuration information at step S14 (No at step S14) or when the communication apparatus to which the token-circulation-order determining unit 16 returns is at the highest level at step S27 (Yes at step S27), the token-circulation-order determining unit 16 determines whether an unsearched port of the master station is present (step S31). When an unsearched port is present (Yes at step S31), the token-circulation-order determining unit 16 returns to step S12, and the processing explained above is performed for the unsearched port of the master station. When an unsearched port is absent (No at step S31), the registration processing in the token circulation table is already performed for all the communication apparatuses. Therefore, the processing for determining circulation order of a token ends.

According to the processing explained above, in the network configuration in which the communication apparatuses are connected in a tree shape while branching from the master station, when the token-circulation-order determining unit 16 establishes a route reaching from the master station to a communication apparatus at the bottom, the token-circulation-order determining unit 16 returns to a communication apparatus branching in a position closest to the communication apparatus at the bottom and establishes a route reaching from the position to another communication apparatus at the bottom. The token-circulation-order determining unit 16 repeats such processing in order and establishes routes reaching all communication apparatuses at the bottom. Consequently, in a network including communication apparatuses connected in a tree shape, the communication apparatuses can be connected by the method of drawing in a single stroke. In a route starting from the master station and returning to the master station established in this way, the number of communication apparatuses that a token frame passes is minimized.

Specific processing for determining circulation order of a token is explained with reference to the network shown in FIG. 3 as an example. FIGS. 9-1 to 9-5 are schematic diagrams of an example of a process for creating a token circulation table. First, the token-circulation-order determining unit 16 selects the master station X and one port X1 of the master station X from the network configuration information shown in FIG. 5 (steps S11 to S12). As shown in FIG. 9-1, the token-circulation-order determining unit 16 registers the selected master station and the selected port X1 "master station X (X1)" in the token circulation table (step S13).

Thereafter, the token-circulation-order determining unit 16 performs a search to find whether a record in which "host apparatus name" is "master station" and "host apparatus port" is "X1" is present in the network configuration information shown in FIG. 5. As a result, the token-circulation-order determining unit 16 extracts a record 501. Because "subordinate apparatus" of the record 501 is "hub H", the token-circulation-order determining unit 16 registers this "hub H" in the token circulation table (step S15). As shown in FIG. 9-2, a state in which the "hub H" is registered on the right side of the "master station X (X1)" and the "master station X (X1)" and the "hub H" are connected by an arrow extending from the "master station X (X1)" to the "hub H". The direction of the arrow indicates a lower level.

Thereafter, the token-circulation-order determining unit 16 selects this "hub H" (step S16). The token-circulation-order determining unit 16 performs a search to find whether a record in which "host apparatus name" is "hub" is present in the network configuration information shown in FIG. 5 (step S17). As a result, the token-circulation-order determining unit 16 extracts records 502 to 504. In the records 502 to 504, "subordinate apparatus" is "slave station A", "slave station B", and "slave station C", respectively. As shown in FIG. 9-3, the token-circulation-order determining unit 16 arranges the "slave station A", the "slave station B", and the "slave station C" in parallel under the "hub H" in the token circulation table (step S19).

Subsequently, the token-circulation-order determining unit 16 selects the slave station A among the registered communication apparatuses (step S20). The token-circulation-order determining unit 16 performs a search to find whether a record in which "host apparatus name" is "slave station A" is present in the network configuration information shown in FIG. 5 (step S21). However, because the relevant record is absent in the network configuration information shown in FIG. 5, the record is not extracted (No at step S18). This means that a communication apparatus is absent under the "slave station A". As shown in FIG. 9-4, "none" is described for convenience under the "slave station A" of the token circulation table.

Subsequently, the token-circulation-order determining unit 16 selects "slave station B" as another unsearched communication apparatus at the same level as the "slave station A" (steps S22 to S23). The token-circulation-order determining unit 16 performs a search to find whether a record in which "host apparatus name" is "slave station B" is present in the network configuration information shown in FIG. 5 (step S24). However, because the relevant record is absent in the network configuration information shown in FIG. 5, the record is not extracted (No at step S18). This means that a communication apparatus is absent under the "slave station B".

Similarly, the token-circulation-order determining unit 16 selects "slave station C" as another unsearched communication apparatus at the same level as the "slave station B" and performs a search to find whether a record in which "host apparatus name" is "slave station C" is present in the network configuration information shown in FIG. 5. However, because the relevant record is absent in the network configuration information shown in FIG. 5, a communication apparatus is absent under the "slave station C". As shown in FIG. 9-5, "none" is described for convenience under the "slave station B" and the "slave station C" of the token circulation table.

Because another unsearched communication apparatus at the same level as the "slave station C" is absent (No at step S22), the token-circulation-order determining unit 16 returns to the "hub H", which is the communication apparatus at the higher level closest to the "slave station C" (step S25). Because this communication apparatus is a hub (Yes at step S26), the token-circulation-order determining unit 16 returns to the "master station X (X1)", which is the communication apparatus at the higher level closest to the "hub H". Because the "master station X (X1)" is not a hub (No at step S26) and is a communication apparatus at a highest level (Yes at step S27), the token-circulation-order determining unit 16 checks whether an unsearched port is present in the master station X (step S31). However, because no unsearched port is present (No at step S31), the processing for determining circulation order of a token ends. According to the processing explained above, a token circulation table shown in FIG. 9-5 is obtained. For example, token circulation order indicated by (A) below is obtained.

Master station X→hub H→slave station A→hub H→slave station B→hub H→slave station C→hub H→master station (A)

In a tree structure leading to the hub H, whichever of branching sections can be set earlier. Therefore, token circulation orders indicated by (B) to (F) below can be adopted.

Master station X→hub H→slave station A→hub H→slave station C→hub H→slave station B→hub H→master station (B)

Master station X→hub H→slave station B→hub H→slave station A→hub H→slave station C→hub H→master station (C)

Master station X→hub H→slave station B→hub H→slave station C→hub H→slave station A→hub H→master station (D)

Master station X→hub H→slave station C→hub H→slave station B→hub H→slave station A→hub H→master station (E)

Master station X→hub H→slave station C→hub H→slave station A→hub H→slave station B→hub H→master station All the token circulation orders of (A) to (F) above are orders that can be drawn in a single stroke. In a route starting from the master station X and returning to the master station X, the number of communication apparatuses that a token frame passes (the number of times the token frame propagates through a transmission line among the communication apparatuses) is eight, which is a minimum number of times. The token circulation order generated as explained above is stored in the network-information storing unit 17.

<Token Circulation Time Calculation Processing>

FIG. 10 is a flowchart of an example of a procedure of token circulation time calculation processing according to the first embodiment. First, the performance estimating unit 18 calculates, from the token circulation order determined by the token-circulation-order determining unit 16, the number of times a token frame passes the hubs (step S51). Subsequently, the performance estimating unit 18 acquires, from the attribute information, token hold times of the slave stations in the token circulation order and delay times of the hubs (step S52).

Thereafter, the performance estimating unit 18 calculates, as a token circulation time, a sum of the token hold times concerning the slave stations included in the network and a product of the delay times and the number of times of passing calculated at step S51 concerning the hubs (step S53). The performance estimating unit 18 displays the calculated token circulation time on the display unit 12 (step S54). The processing ends.

Specific processing for calculating a token circulation time shown in FIG. 10 is explained with reference to the network shown in FIG. 3 as an example. First, the performance estimating unit 18 calculates, from the token circulation order, the number of times a token frame passes the hub H (step S51). For example, from the token circulation order shown in (A) above, the number of times the token frame passes the hub H is four times. From the attribute information shown in FIG. 6, token hold times of the slave stations A, B, and C are respectively 20 microseconds, 30 microseconds, and 50 microseconds and a delay time of the hub H is 10 microseconds (step S52).

Subsequently, the performance estimating unit 18 calculates a token circulation time as indicated by a formula described below and displays a result of the calculation on the display unit 12 (steps S53 to S54).

$$\begin{aligned}\text{Token circulation time} &= \\ \text{token hold time of the slave station } A &+ \text{token hold time of the} \\ \text{slave station } B &+ \text{token hold time of the slave station } C + \\ \text{delay time of the } hub &\times \text{number of times of passing} = \\ 20 \ \mu\text{sec} + 30 \ \mu\text{sec} + 50 \ \mu\text{sec} &+ 10 \ \mu\text{sec} \times 4 = 140 \ \mu\text{sec}\end{aligned}$$

FIG. 11 is a schematic diagram of an example of a method of calculating a token circulation time according to the first embodiment. In FIG. 11, a token frame circulates in the order of (A) above. Specifically, as shown in the figure, the token frame is passed from the master station X to the slave station A and, after transmitting a data frame, the slave station A passes the token frame to the slave station B. After transmitting the data frame, the slave station B passes the token frame to the slave station C. After transmitting the data frame, the slave station C passes the token frame to the master station X.

In this one cycle, the token frame is passed from the master station X to the slave station A, from the slave station A to the slave station B, from the slave station B to the slave station C, or from the slave station C to the master station X. At this point, because the token frame passes the hub H, a time during the passing of the token frame is calculated as a delay time of the hub. Processing time by hardware and firmware from the passing of the token frame and the reception of the data frame in the slave stations A to C until the transmission of the token frame is calculated as a token hold time. Consequently, in the first embodiment, a token circulation time is calculated using, rather than data amounts transmitted and received by the communication apparatuses, communication performance obtained taking into account the hardware and the firmware of the communication apparatuses and the token circulation order calculated from the connection relation. Therefore, the token circulation time is more accurately calculated compared with the past.

The network performance estimating apparatus 10 having such a configuration can be realized by a personal computer or the like including a central processing unit (hereinafter referred to as CPU), a storage device such as a HDD (Hard Disk Drive), which stores computer programs and data, and a RAM (Random Access Memory), on which the computer programs are expanded according to a command from the CPU, connected via a bus and including input means such as a keyboard and display means such as a liquid crystal display.

In the first embodiment, the network configuration information indicating the connection relation among the communication apparatuses in the network is acquired from the communication apparatuses arranged by the user, the token circulation order is determined from the network configuration information, and the token circulation time is calculated using the token circulation order, the token hold times of the slave stations, and the delay time of the hub. As a result, the user can learn the performance of the network before the user actually constructs the network. In particular, when a token passing system is adopted for a network required to have high-speed performance on the Ethernet (registered trademark) base, a connection state of the communication apparatuses and presence or absence of the hub substantially affect the performance. Therefore, the network performance estimating apparatus 10 acquires network configuration information, which is connection information of actual cables, installs a calculation algorism function for token circulation order of the master station, and recognizes the token circulation order. This makes it possible to take into account a delay time of the hub and perform estimation in token circulation order in causing the communication apparatuses to operate on an actual system. Therefore, there is an effect that it is possible to obtain a more accurate estimation value compared with the past.

During estimation of network performance, token circulation order is determined such that the number of communication apparatuses that a token frame passes is minimized in a route starting from the master station and returning to the master station in a designed network. As a result, there is an effect that, in a network constructed according to a result of this estimation, it is possible to efficiently circulate the token frame and reduce environmental loads on equipments and a production process itself.

Second Embodiment

In the first embodiment, the calculation processing for a token circulation time using the attribute information of the slave stations and the hub connected to the network is explained as an estimation of network performance. In this second embodiment, calculation processing for a hold time of the master station is explained.

A network performance estimating apparatus according to the second embodiment includes a configuration same as the configuration shown in FIG. 1 in the first embodiment but is different in points explained below. First, in the peculiar information of the communication-apparatus-peculiar-information storing unit 13, information necessary for calculating a hold time in the master station is stored. FIG. 12 is a table of an example of peculiar information of the communication apparatuses. As shown in the figure, the peculiar information further includes, compared with FIG. 2 in the first embodiment, "input data amount" and "output data amount" indicating a maximum data amount that can be processed by the slave station and "input throughput" and "output throughput" indicating a data throughput of the master station. As values input to the "input data amount" and the "output data amount" of the slave station, performance obtained taking into account firmware processing is stored. As the "input throughput" and the "output throughput" of the master station, processing speed including time for input and output and time required for firmware processing is stored.

The communication-apparatus-attribute-information acquiring unit 15 has a function of acquiring, from the peculiar information of the communication-apparatus-peculiar-information storing unit 13, information including input data amounts and output data amounts of the slave stations necessary for calculating a hold time of the master station and an input throughput and an output throughput of the master station and storing the information in the attribute information of the network-information storing unit 17.

Further, the attribute information of the network-information storing unit 17 includes, in FIG. 4 (FIG. 6) in the first embodiment, "input data amount" and "output data amount", which are maximum data amounts that can be processed in the slave station, and "input throughput" and "output throughput" indicating data throughput in the master station. FIG. 13 is a table of an example of attribute information according to the second embodiment. The "input data amount", the "output data amount", the "input throughput", and "output throughput" correspond to communication performance.

Further, in addition to the token circulation time calculation processing in the first embodiment, the performance estimating unit 18 calculates, as a hold time of the master station, a sum of an input processing time in which data received from all the slave stations present in the network is processed and an output processing time in which data to be transmitted to all the slave stations present in the network is processed. Specifically, after calculating a sum of the input data amounts and a sum of the output data amounts of the slave stations acquired by the communication-apparatus-attribute-information acquiring unit 15, the performance estimating unit 18 calculates, as a master station hold time, a sum of a product of the sum of the input data amounts of the slave station and the output throughput of the master station and a product of the output data amounts of the slave stations and the input throughput of the master station.

Figures 14, 15:
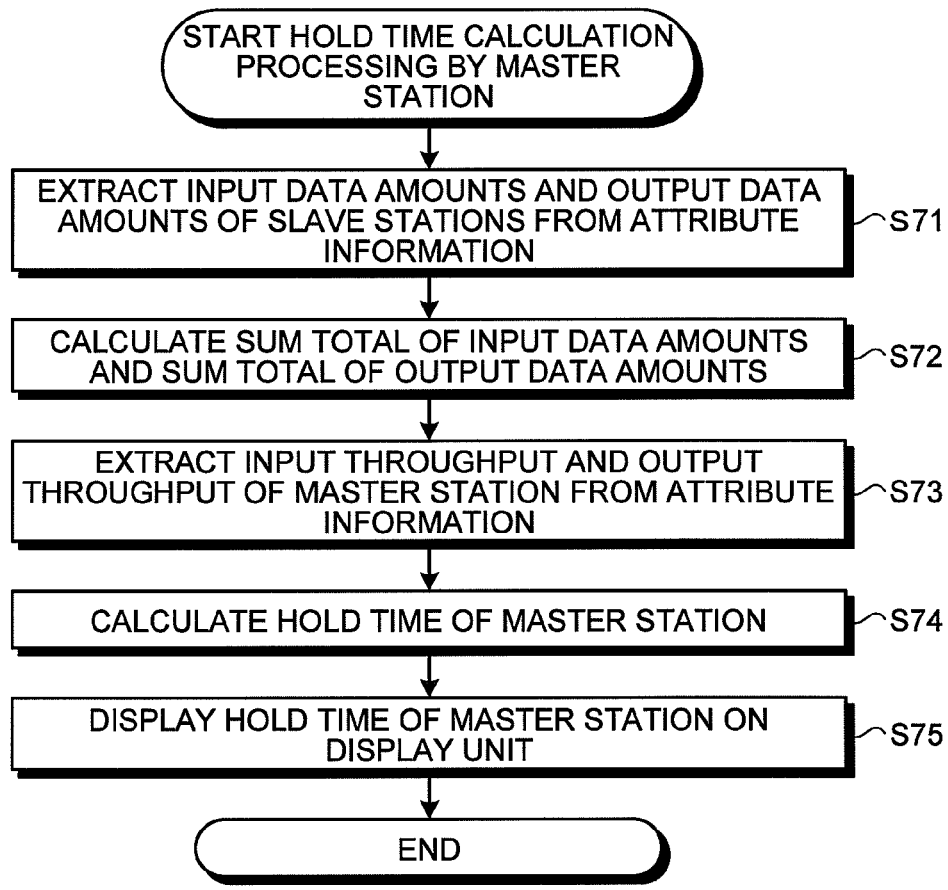
FIG. 14 is a flowchart for explaining an example of a procedure of hold time calculation processing by a master station according to a second embodiment.
FIG. 15 is a table of an example of an input data amount and an output data amount of an extracted slave station.

A procedure for calculation processing for a master station hold time is explained. FIG. 14 is a flowchart for explaining an example of a procedure of hold time calculation processing for the master station according to the second embodiment. First, the performance estimating unit 18 extracts input data amounts and output data amounts of the slave stations from the attribute information of the network-information storing unit 17 (step S71) and calculates a sum total of the input data amounts and a sum total of the output data amounts (step S72). The performance estimating unit 18 extracts an input throughput and an output throughput of the master station from the attribute information (step S73).

Thereafter, the performance estimating unit 18 calculates, as a master station hold time, a sum of a product obtained by multiplying the sum total of the input data amounts of the slave stations with the output throughput of the master station and a product obtained by multiplying the sum total of the output data amounts of the slave stations with the input throughput of the master station (step S74). The performance estimating unit 18 displays a result of the calculation on the display unit 12 (step S75), and the processing ends.

The hold time of the master station is calculated on condition that the slave stations handle maximum input data amounts and maximum output data amounts.

Specific processing for calculating a hold time of the master station shown in FIG. 14 is explained. Calculation processing for a master station hold time in the network configuration shown in FIG. 3 is explained. First, the performance estimating unit 18 of the master station X extracts input data amounts and output data amounts of the slave stations A to C from the attribute information shown in FIG. 13 stored in the network-information storing unit 17 and calculates a sum of the input data amounts and a sum of the output data amounts (steps S71 to S72). FIG. 15 is a table of an example of the extracted input data amounts and output data amounts of the slave stations. Input data amounts and output data amounts concerning the slave stations A to C and a sum of the input data amounts and a sum of the output data amounts are shown. Both a sum total of the input data amounts and a sum total of the output data amounts of the slave stations A to C are 1,500 bytes.

The performance estimating unit 18 extracts an input throughput and an output throughput of the master station X from the attribute information shown in FIG. 13 (step S73). Thereafter, the performance estimating unit 18 calculates a master station hold time as indicated by a formula below and displays a result of the calculation on the display unit 12 (steps S74 to S75).

Master station hold time = sum total of the input data amounts × output throughput + sum total of the output data amounts × input throughput =

1,500 bytes × 40 nsec/byte + 1,500 bytes × 50 nsec/byte =

$1.35 \times 10^{-4}$ sec

In the second embodiment, only processing for calculating a hold time of the master station as network performance is performed. However, as in the first embodiment, calculation of a token circulation time can be simultaneously performed.

In the second embodiment, the input data amounts and the output data amounts of the slave stations and the input throughput and the output throughput of the master station are calculated from the peculiar information. The master station hold time, which is the time for processing input data from the slave stations in the master station and the time for processing output data to be transmitted to the slave station, is calculated using the input data amounts and the output data amounts and the input throughput and the output throughput. As a result, there is an effect that it is possible to calculate a token hold time of the master station.

When performances of the slave stations are different, a hold time for the token frame cannot be calculated from transmission and reception data amounts. However, in the second embodiment, because the attribute information obtained by taking into account firmware processing of the communication apparatuses is used, there is also an effect that it is possible to accurately estimate a token hold time of the master station.

Third Embodiment

In the first embodiment, a token circulation time is calculated assuming that the slave stations transmit and receive the input data amounts and the output data amounts of the maximum capability set in the apparatuses. However, in the explanation in this third embodiment, input data amounts and output data amounts processed in the slave stations are designated in advance and a token circulation time at the time when a system is operated with the designated input and output data amounts is calculated.

A network performance estimating apparatus according to the third embodiment has a configuration same as the configuration shown in FIG. 1 in the first embodiment but is different in points explained below. First, the peculiar information of the communication-apparatus-peculiar-information storing unit 13 further includes, in FIG. 2 in the first embodiment, "input data amount" and "output data amount" indicating a maximum data amount that can be processed by the slave station and "input throughput" and "output throughput" indicating a data throughput of the master station. In the "input data amount" and the "output data amount", performance obtained taking into account firmware processing by the slave station is stored. In the "input throughput" and the "output throughput" of the master station, processing speed including time for input and output and time required for firmware processing is stored. Peculiar information used in the third embodiment is, for example, peculiar information shown in FIG. 12.

An attribute information input form used in the network-configuration depicting unit 14 includes a configuration in which set input data amounts and set output data amount, which are input data amounts and output data amounts processed in the slave stations, can be input to arrange figures of the slave stations. The network-configuration depicting unit 14 stores values input to the attribute information input form in the attribute information of the network-information storing unit 17.

Further, the attribute information of the network-information storing unit 17 further includes, in FIG. 4 in the first embodiment, "input data amount" and "output data amount", which are maximum data amounts that can be processed in the slave station, "set input data amount" and "set output data amount" set by the user, and "input throughput" and "output throughput" indicating data throughput in the master station. FIG. 16 is a table of an example of attribute information according to the third embodiment. The "input data amount", the "output data amount", the "input throughput", and "output throughput" correspond to communication performance.

The communication-apparatus-attribute-information acquiring unit 15 has a function of acquiring, from the peculiar information of the communication-apparatus-peculiar-information storing unit 13, information including input data amounts and output data amounts of the slave stations necessary for calculating a token circulation time based on a data amount actually used in the performance estimating unit 18 and an input throughput and an output throughput of the master station and storing the information in the network-information storing unit 17 as attribute information.

Further, the performance estimating unit 18 calculates a token circulation time according to a sum of token hold times of the slave stations corrected with set input data amounts and set output data amounts and a product of a delay time of the hub and the number of times a token frame passes the hub. Specifically, it is assumed that n slave stations are connected and m hubs are connected to the network. Set input data of an ith slave station is represented as SIDi, set output data of the ith slave station is represented as SODi, an input data amount of the ith slave station is represented as IDi, an output data amount of the ith slave station is represented as ODi, a token hold time of the ith slave station is represented as THSi, a delay time of a jth hub is represented as TDHj, and the number of times a token frame passes the jth hub is represented as Pj. Then, a token circulation time T is calculated according to Formula below (1).

$$T = \sum_{i=1}^{n} \frac{SIDi + SODi}{IDi + ODi} \cdot THSi + \sum_{j=1}^{m} TDH_j \cdot P_j \qquad (1)$$

The performance estimating unit 18 can use, concerning a slave station, a set input data amount or a set output data amount of which are not set by the user, an input data amount or an output data amount of a corresponding slave station in the attribute information as the set input data amount or the set output data amount.

Figures 17, 18:
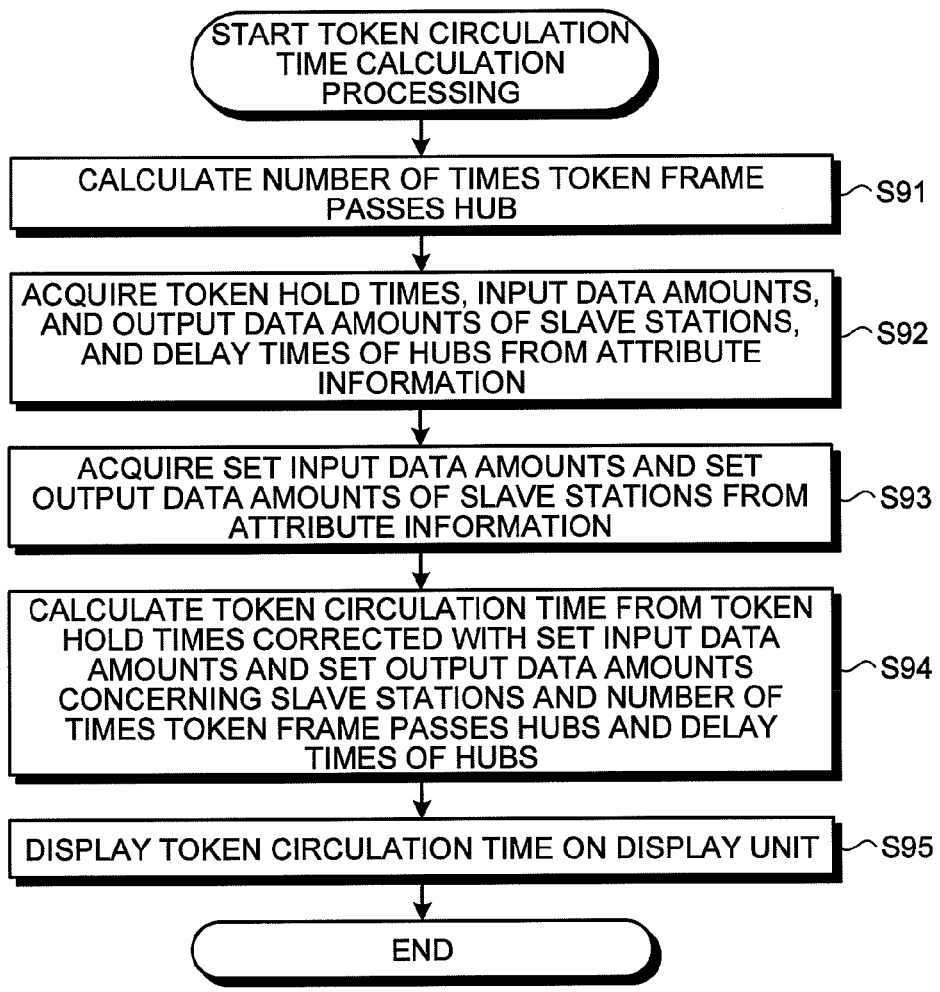
FIG. 17 is a flowchart for explaining an example of a procedure of token circulation time calculation processing according to a third embodiment.
FIG. 18 is a table of an example of token hold times, input data amounts, and output data amounts of slave stations.

A method of calculation processing for a token circulation time is explained. FIG. 17 is a flowchart for explaining an example of a procedure of token circulation time calculation processing according to the third embodiment. First, the performance estimating unit 18 calculates, from the token circulation order determined by the token-circulation-order determining unit 16, the number of times a token frame passes the hubs (step S91). Subsequently, the performance estimating unit 18 acquires, from the attribute information of the network-information storing unit 17, token hold times and input data amounts and output data amounts of the slave stations in the token circulation order and delay times of the hubs (step S92). The performance estimating unit 18 acquires, from the attribute information of the network-information storing unit 17, set input data amounts and set output data amounts set in the slave stations in the token circulation order (step S93).

Thereafter, the performance estimating unit 18 calculates, as a token circulation time, a sum of the token hold times corrected with the set input data amounts and the set output data amounts concerning the slave stations included in the network and a product of the delay times and the number of times of the token frame concerning the hubs (step S94). The performance estimating unit 18 displays the calculated token circulation time on the display unit 12 (step S95), and the processing ends.

Specific processing for calculating a token circulation time shown in FIG. 16 is explained with reference to the network shown in FIG. 3 as an example. First, the performance estimating unit 18 calculates, from the token circulation order, the number of times a token frame passes the hub H (step S91). From the token circulation order shown in (A) above, the number of times the token frame passes the hub H is four times. The performance estimating unit 18 acquires, from the attribute information shown in FIG. 6, token hold times and input data amounts and output data amounts of the slave stations A, B, and C and a delay time of the hub H (step S92). FIG. 18 is a table of an example of the token hold times and the input data amounts and the output data amounts of the slave stations. The delay time of the hub H is 10 microseconds. Further, the performance estimating unit 18 acquires the set input data amounts and the set output data amounts of the slave stations A, B, and C from the attribute information (step S93). FIG. 19 is a table of an example of the set input data amount and the set output data amount of the slave stations.

Subsequently, the performance estimating unit 18 calculates a token circulation time according to Formula (1) and displays a result of the calculation on the display unit 12 (steps S95 and S96).

$$\text{Token circulation time} =$$
$$(50 + 75)/(100 + 100) \times 20 + (200 + 250)/(1{,}000 + 1{,}000) \times 30 +$$
$$(300 + 350)/(400 + 400) \times 50 = 66.125 \text{ μsec}$$

In the example in the above explanation, the user inputs the set input data amounts and the set output data amounts from the input unit 11. However, input information serving as indexes of data amounts such as cyclic data map information in which a transmission area and a reception area are designated can be used. When processing of input data is not included in a token hold time, the data amounts can be calculated with only output data. Further, in the above explanation, only the token circulation time is calculated as the network performance. However, as in the second embodiment, a master station hold time can be calculated together with the token circulation time.

In the third embodiment, the token hold time is corrected to acquire the token circulation time using the set input data amounts and the set output data amounts predicted to be actually used in the slave stations of the communication system. Consequently, a token circulation time under operation conditions of the network after construction is obtained. As a result, compared with the case of the first embodiment, there is an effect that it is possible to perform more highly accurate performance estimation for the network.

Fourth Embodiment

In the embodiments explained above, the delay time of the hub is calculated on condition that the peculiar information of the set hub is present in the communication-apparatus-peculiar-information storing unit. However, it is conceivable that peculiar information of a hub to be actually used is absent in the communication-apparatus-peculiar-information storing unit. Therefore, in a fourth embodiment, a method of calculating a delay time of a hub in such a case is explained.

A hub (a switching hub) adopts, concerning a frame that passes the own station, a store-and-forward system for starting transmission after once storing the frame in the buffer. Therefore, a delay time of the hub is different depending on a transmission data amount. Therefore, in the fourth embodiment, a delay time of a hub, peculiar information of which is absent, is calculated using a transmission data amount (an output data amount) transmitted by a master station or a slave station having a transmission right, a data amount of a token frame, and transmission speed set in an entire system.

Figure 20:
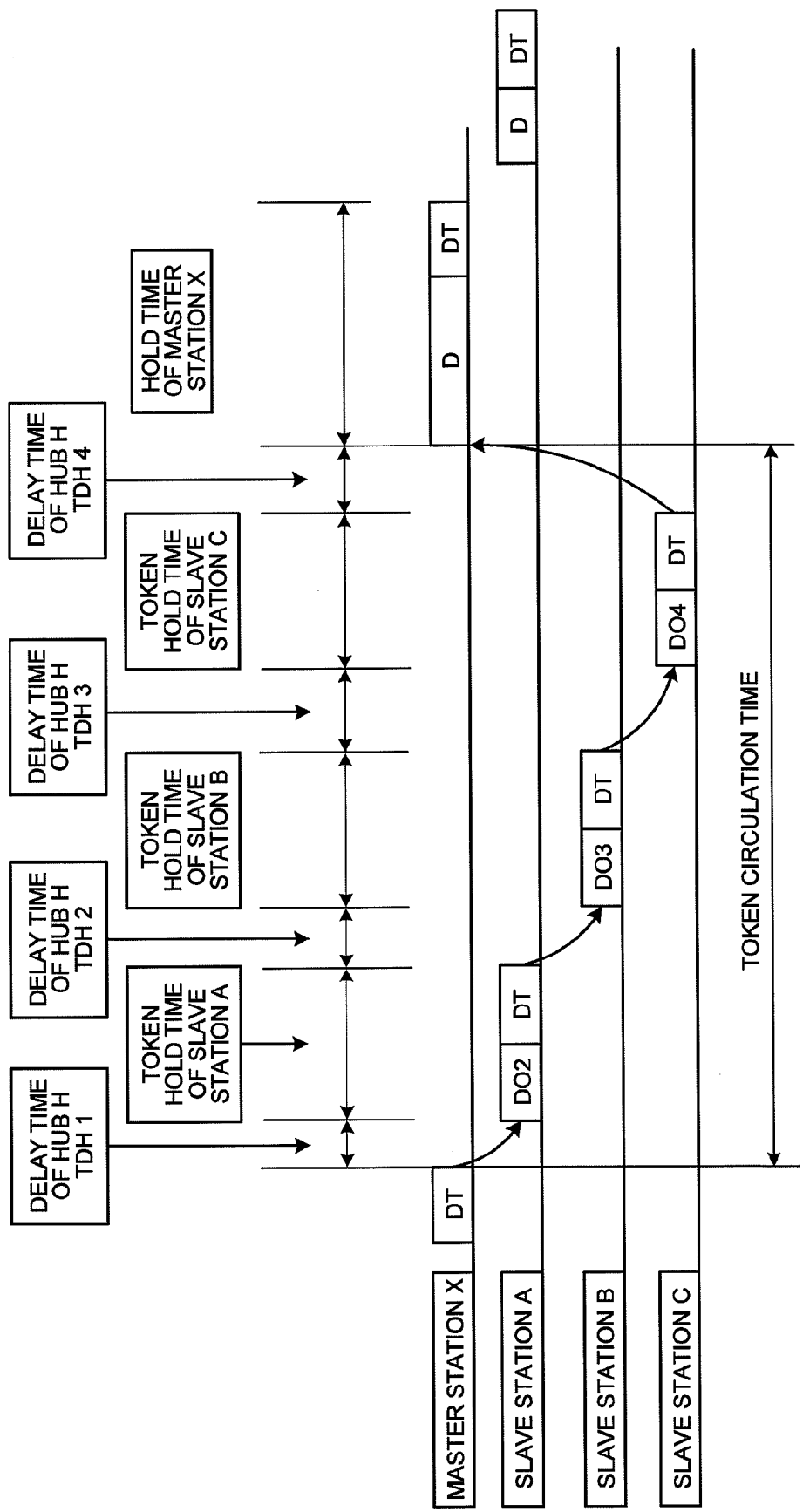
FIG. 20 is a schematic diagram of a state of circulation of a token frame among communication apparatuses.

FIG. 20 is a schematic diagram of a state of circulation of a token frame among the communication apparatuses. The system configuration shown in FIG. 3 is explained as an example. As shown in the figure, a token frame transmitted from the master station circulates to the slave station A, the slave station B, and the slave station C in order and returns to the master station X. During this circulation, there are a delay time TDH1 of the hub H at the time when the token frame is transmitted from the master station X to the slave station A, a delay time TDH2 of the hub H at the time when the token frame is transmitted from the slave station A to the slave station B, a delay time TDH3 of the hub H at the time when the token frame is transmitted from the slave station B to the slave station C, and a delay time TDH4 of the hub H at the time when the token frame is transmitted from the slave station C to the master station X.

In the fourth embodiment, the delay time TDH1 of the hub H depends on a data amount of the token frame and transmission speed of a communication system. The delay time TDH2 of the hub H depends on an output data amount transmitted by the slave station A, the data mount of the token frame, and the transmission speed of the communication system. The delay time TDH3 of the hub H depends on an output data amount transmitted by the slave station B, the data amount of the token frame, and the transmission speed of the communication system. The delay time TDH4 of the hub H depends on an output data amount transmitted by the slave station C, the data amount of the token frame, and the transmission speed of the communication system.

A network performance estimating apparatus according to the fourth embodiment has a configuration same as the configuration shown in FIG. 1 in the first embodiment but is different in points explained below. First, the network-information storing unit 17 can store system information indicating transmission speed of the entire system in association with attribute information.

The network-configuration depicting unit 14 includes a configuration in which an attribute information input form concerning the communication system can be displayed on the display unit 12. Transmission speed of a communication system set in a network can be input to the system attribute information input form. The network-configuration depicting unit 14 stores values input to the attribute information input form concerning the communication system in the system information of the network-information storing unit 17.

Further, in acquiring, from the peculiar information of the communication-apparatus-peculiar-information storing unit 13, information necessary for calculating a token circulation time of the network, when attribute information (a delay time) concerning the hub in the attribute information of the network-information storing unit 17 is absent in the peculiar information, the communication-apparatus-attribute-information acquiring unit 15 inputs nothing to a space of a delay time of a corresponding hub of the attribute information in the network-information storing unit 17.

When a value has been input in the delay time for the hub of the attribute information of the network-information storing unit 17, the performance estimating unit 18 calculates a token circulation time according to the procedure explained in the first embodiment. However, when a value has not been input in the delay time for the hub of the attribute information, the performance estimating unit 18 calculates a delay time of the hub, using token circulation order, system transmission speed, output data amounts of the slave stations and a data amount of the token frame, and calculates a token circulation time according to a sum of the delay time of the hub and token hold times of the slave stations.

Specifically, the performance estimating unit 18 acquires, from the attribute information, an output data amount of a slave station or the master station immediately before a hub, a delay time of which is unknown, in the token circulation order and sets, as a delay time of the hub, a value obtained by dividing a sum of the output data amount and a data amount (e.g., 64 bytes) of the token frame by the transmission speed of the system. For example, when an output data amount of a communication apparatus immediately before a hub appearing jth as a hub in the token circulation order is represented as $DO_i$ (bits), a data amount of the token frame is represented as $DT$ (bits), and the transmission speed of the system is represented as $V$ (bps), a delay time $TDH_j$ of the hub can be calculated according to Formula (2) below. It should be noted that in Formula (2), i represents a sign for identifying a communication apparatus in the system and j is a sign for identifying a hub that token frame passes in the token circulation order.

$$THDj=(DOi+DT)/V \quad (2)$$

1/V is a transmission time for 1 bit of the system. For example, if the transmission speed of the system is 1 Gbps, the transmission time is 1 nanosecond. If the transmission speed of the system is 100 Mbps, the transmission time is 10 nanoseconds.

Calculation processing for a delay time of the hub is explained with reference to the network shown in FIG. 3 as an example. The delay times TDH1, TDH2, TDH3, and TDH4 of the hub H shown in FIG. 20 are explained. Considering that the delay time TDH1 of the hub H is a time for storing a token frame (a data amount DT) transmitted from the master station X in a buffer in the hub H and forwarding the token frame, the delay time TDH1 is calculated as indicated by Formula (3) below.

$$TDH1=DT/V \quad (3)$$

Considering that the delay time TDH2 of the hub H is a time for storing an output data amount DO2 transmitted from the slave station A and the token frame (the data amount DT) and forwarding the output data amount DO2 and the token frame, the delay time TDH2 is calculated as indicated by Formula (4) below.

$$TDH2=(DO2+DT)/V \quad (4)$$

Like the delay time TDH2 of the hub H, when output data amounts transmitted from the slave stations B and C are respectively represented as DO3 and DO4, the delay times TDH3 and TDH4 of the hub H are calculated as indicated by Formulas (5) and (6) below.

$$TDH3=(DO3+DT)/V \quad (5)$$

$$TDH4=(DO3+DT)/V \quad (6)$$

A token circulation time can be calculated using the delay times of the hub H calculated according to Formulas (3) to (6).

In the above explanation, the output data amount is calculated using the output data amounts of the slave stations acquired from the communication-apparatus-peculiar-information storing unit 13 and stored in the attribute information of the network-information storing unit 17. However, the output data amount can be calculated using the set output data amounts input from the input unit 11 by the user as in the third embodiment. In the above explanation, the token circulation time is calculated when a delay time of the hub is unknown in the case of the first embodiment. However, the method of calculating a delay time of the hub can also be applied when a delay time of the hub is unknown in the case of the third embodiment. Further, a hold time of the master station can be calculated together with the token circulation time as in the second embodiment.

In the fourth embodiment, when peculiar information concerning a delay time of the hub is absent, the delay time of the hub is calculated using an output data amount transmitted by the communication apparatus immediately before the hub in the token circulation order, a data amount of the token frame, and transmission speed set in the system. Consequently, there is an effect that, even when attribute information of the hub cannot be acquired, it is possible to perform highly accurate estimation of network performance.

Fifth Embodiment

In this fifth embodiment, a network performance estimating apparatus and a network configuration checking method that can determine whether a network configuration created by the network performance estimating apparatus and a network configuration actually assembled by a user coincide with each other are explained. Further, a communication managing apparatus and a data communication method for obtaining connection information for a constructed network necessary for comparison of the network configurations are explained.

Figure 21:
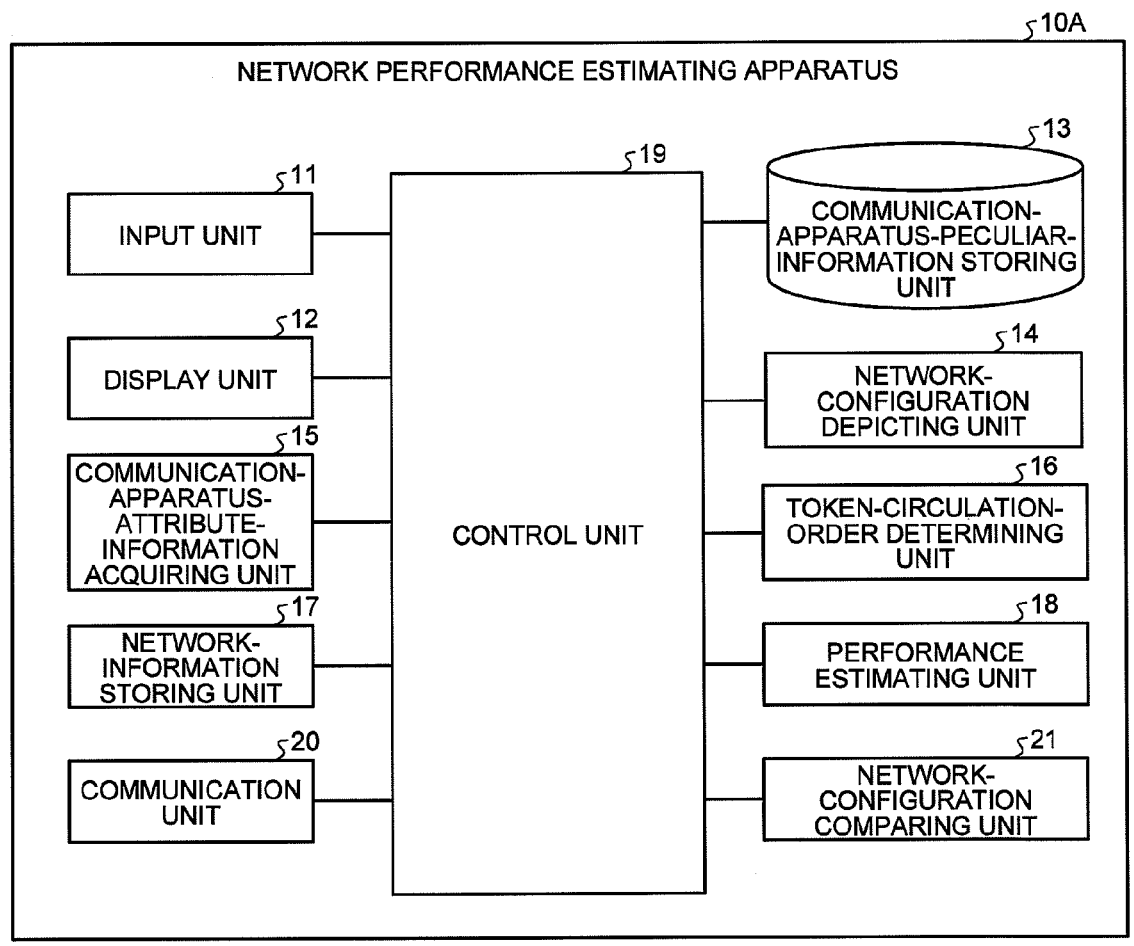
FIG. 21 is a schematic block diagram of the configuration of a network performance estimating apparatus according to a fifth embodiment.

FIG. 21 is a schematic block diagram of the configuration of the network performance estimating apparatus according to the fifth embodiment. This network performance estimating apparatus 10A further includes, in FIG. 1 in the first embodiment, a communication unit 20 and a network-configuration comparing unit 21. The communication unit 20 is connected to an FA network actually constructed via a communication line and performs communication with communication apparatuses on the FA network.

The network-configuration comparing unit 21 acquires network connection information and apparatus information from a master station in the FA network, compares the network connection information and the apparatus information with network configuration information stored in the network-information storing unit 17, determines whether a constructed network has a configuration same as the configuration of a designed network, and displays a result of the determination on the display unit 12. Components same as those in the first embodiment are denoted by the same reference numerals and signs and explanation of the components is omitted.

Figure 22:
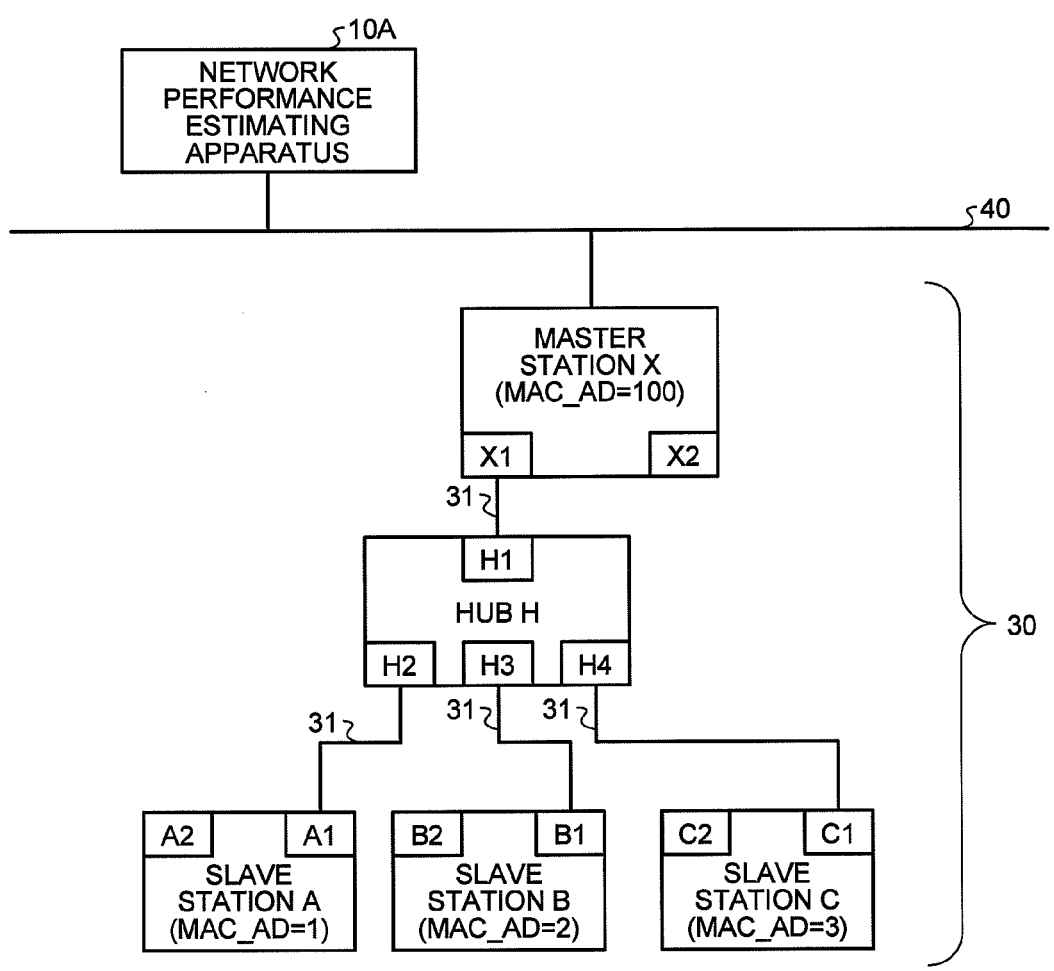
FIG. 22 is a schematic diagram of an example of a state in which the network performance estimating apparatus and an FA network are connected.

FIG. 22 is a schematic diagram of an example of a state in which the network performance estimating apparatus and the FA network are connected. As shown in the figure, The network performance estimating apparatus 10A and an FA network 30 are connected via a network 40.

The FA network 30 includes, like the FA network shown in FIG. 3, a network in the same segment in which the master station X, the slave stations A to C, and the hub H are connected by a cable 31 as a transmission line. The master station X functions as a communication managing apparatus that manages transmission and reception of data (frames) in the network of the same segment. The slave stations A to C perform transmission of the data (the frames) based on a setting by the master station X. The hub H relays the data (the frames) from the master station X and the slave stations A to C in the store-and-forward system.

Each of the master station X and the slave stations A to C has, for example, two ports. The hub H has a plurality of ports. The ports of the communication apparatuses are connected via a cable 31 through which half-duplex communication is possible such as a coaxial cable or through which full-duplex communication is possible such as a twist pair cable or an optical fiber. The number of ports can be three or more. It is assumed that the communication apparatuses X, A to C, and H are connected by an Ethernet (registered trademark). The master station X includes a not-shown communication unit to be connectable to the network performance estimating apparatus 10A via the network 40.

As shown in FIG. 22, a first port H1 of the hub H is connected to a first port X1 of the master station X. No port is connected to a second port X2. A first port A1 of the slave station A is connected to a second port H2 of the hub H. A first port B1 of the slave station B is connected to a third port H3 of the hub H. A first port C1 of the slave station C is connected to a fourth port H4 of the hub H. No port is connected to second ports A2, B2, and C2 of the slave stations A, B, and C.

It is assumed that MAC (Media Access Control) addresses (in the figure, represented as MAC_AD) of the master station X and the slave stations A to C are set as described below.

Master station X=100
Slave station A=1
Slave station B=2
Slave station C=3

Figures 1, 23:
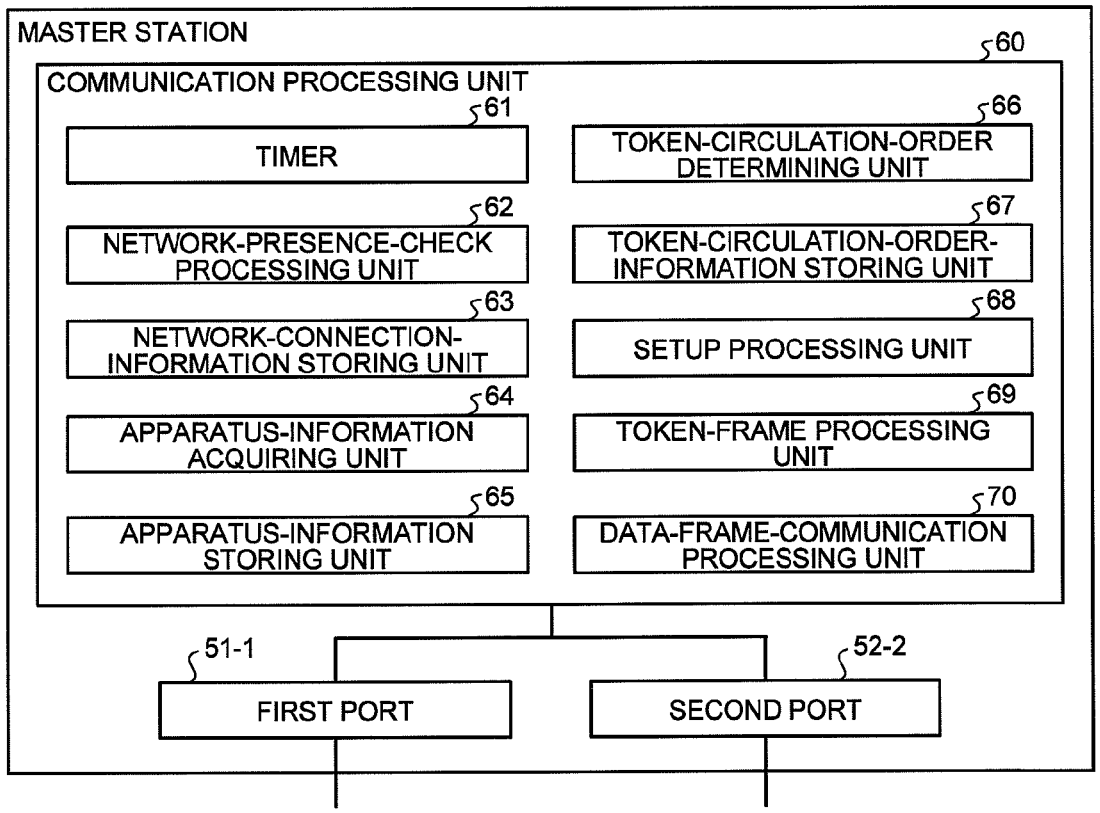
Figures 2, 23:
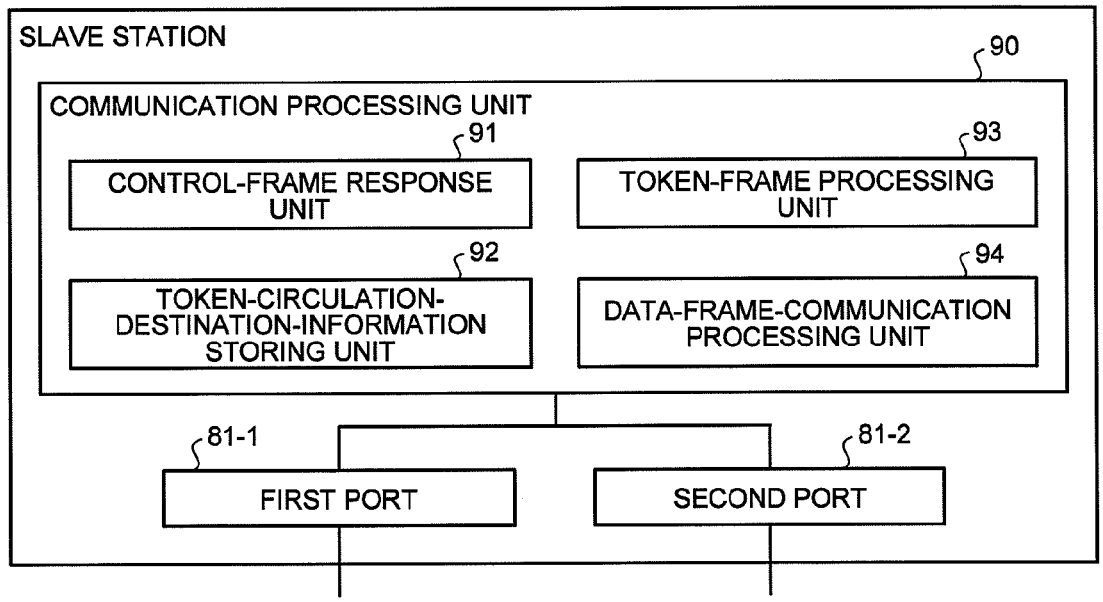

FIG. 23-1 is a schematic block diagram of a functional configuration of the master station. A master station includes ports 51-1 and 51-2 for connecting an Ethernet (registered trademark) cable between a communication apparatus adjacent thereto and itself and a communication processing unit 60 that performs, for example, transmission and reception processing of frames via the ports 51-1 and 51-2 and processing for recognizing a connection configuration of a network and establishing transmission order of a token frame.

For example, the ports include two ports: the first port 51-1 and the second port 51-2. Both the two ports 51-1 and 51-2 are connected to ports of a slave station or ports of a hub adjacent to the master station.

The communication processing unit 60 includes a timer 61, a network-presence-check processing unit 62, a network-connection-information storing unit 63, an apparatus-information acquiring unit 64, an apparatus-information storing unit 65, a token-circulation-order determining unit 66, a token-circulation-order-information storing unit 67, a setup processing unit 68, a token-frame processing unit 69, and a data-frame-communication processing unit 70.

The timer 61 is started by a processing unit in the communication processing unit 60 and has a function of measuring a predetermined time. In the fifth embodiment, the timer 61 measures time to determine whether the predetermined time has elapsed after a network presence check frame is transmitted by the network-presence-check processing unit 62.

The network-presence-check processing unit 62 performs, after a power supply for the own apparatus is turned on or after a state set in advance occurs, network presence check processing for detecting a connection state of communication apparatuses (slave stations) included in an FA network (a communication system) of the same segment and performs processing for recognizing a connection state of communication apparatuses in a network. Specifically, the network-presence-check processing unit 62 creates a network presence check frame and transmits the network presence check frame by "broadcast" and generates, from information included in network presence check response frames, which are responses to the network presence check frame, from the communication apparatuses present in the communication system (the FA network), network connection information, which is a connection state among the communication apparatuses present in the network. The network-presence-check processing unit 62 performs the generation of network connection information every time the network-presence-check processing unit 62 receives the network presence check response frame.

Figures 1, 24:
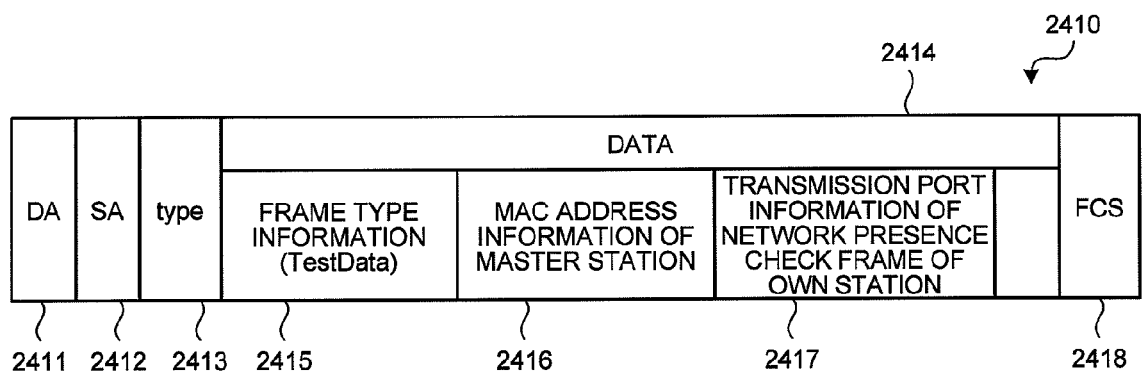
Figures 2, 24:
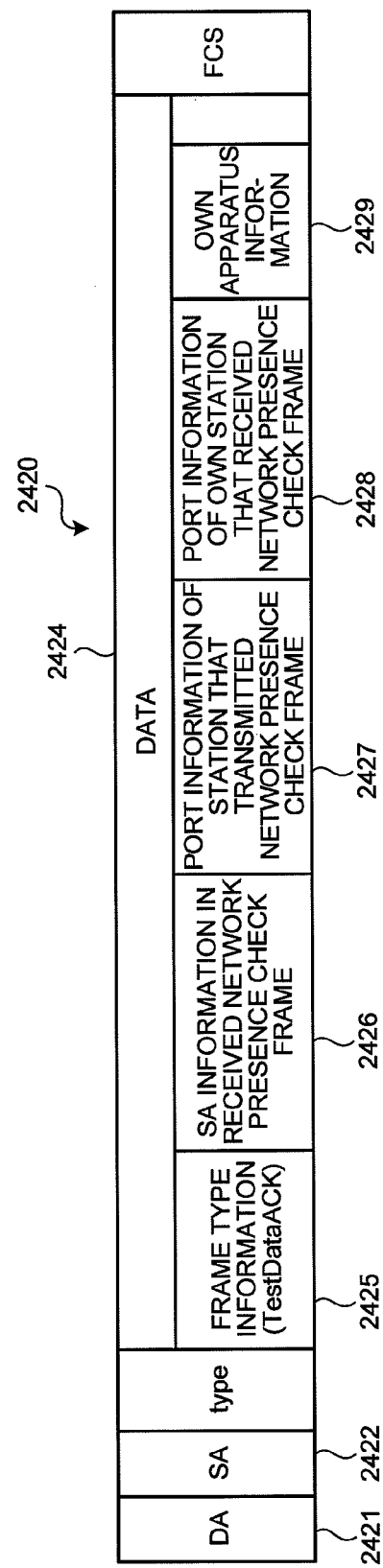

FIG. 24-1 is a diagram of an example of a format of the network presence check frame. A network presence check frame 2410 is an Ethernet (registered trademark) frame and includes a destination MAC address (hereinafter referred to as DA) 2411, a transmission source MAC address (hereinafter referred to as SA) 2412, an Ethernet (registered trademark) type 2413, data 2414 in which data in an upper layer is stored, and an FCS (Frame Check Sequence) 2418 in which check results concerning whether an error is present in information stored in the DA 2411 to the data 2414 of the own frame are stored.

In the fifth embodiment, frame type information 2415, MAC address information 2416 of the master station, and transmission port information 2417 of the network presence check frame of the own station are stored in a part of the data 2414.

The frame type information 2415 is information for identifying what kind of frame an own Ethernet (registered trademark) frame is. In the frame type information 2415, information indicating that the own Ethernet (registered trademark) frame is the network presence check frame 2410 is stored. In this example, the network presence check frame is represented as "TestData".

In the MAC address information 2416 of the master station, an MAC address of the master station is stored. In the transmission port information 2417 of the network presence check frame of the own station, port information indicating from which port the communication apparatus transmits the network presence check frame 2410 is stored.

FIG. 24-2 is a diagram of an example of a format of the network presence check response frame. This network presence check response frame 2420 is also an Ethernet (registered trademark) frame. Information used in the fifth embodiment is defined in data 2424. Specifically, frame type information 2425, SA information 2426 in a received network presence check frame, port information 2427 of a station that transmitted the network presence check frame, port information 2428 of the own station that received the network presence check frame, and own apparatus information 2429 are stored in a part of the data 2424.

In the frame type information 2425, information indicating that the Ethernet (registered trademark) frame is the network presence check response frame 2420 is stored. In this specification, the network presence check response frame is represented as "TestDataACK". In the "SA information in a received network presence check frame" 2426, a MAC address stored in the SA 2412 area of the network presence check frame 2410 received by the slave station is stored. In the "port information of a station that transmitted the network presence check frame" 2427, port information stored in the "transmission port information of the network presence check frame of the own station" 2417 of the data 2414 area in the network presence check frame 2410 received by the slave station is stored. In the "port information of the own station that receives the network presence check frame" 2428, port information of a port of the slave station to which the received network presence check frame is input is stored. In the "own apparatus information" 2429, apparatus information for specifying the own station such as a model name and a manufacturer name of the own apparatus is stored. In a DA 2421 of the network presence check response frame 2420, a value of the "MAC address information of the master station" 2416 of the received network presence check frame 2410 is stored.

When the network-presence-check processing unit 62 receives the network presence check response frame 2420, the network-presence-check processing unit 62 generates network presence information in which the "SA information in a received network presence check frame" 2426, the "port information of a station that transmitted the network presence check frame" 2427, and the "port information of the own station that received the network presence check frame" 2428 in the data 2424 are associated with "SA" 2422 of the received network presence check response frame 2420. The network-presence-check processing unit 62 creates, using the network presence information, a connection relation including the ports of the communication apparatuses connected to the own station as network connection information.

The network-connection-information storing unit 63 stores the network connection information generated by the network-presence-check processing unit 62. The network connection information includes a line of communication apparatuses connected to the first port 51-1 of the own station and a line of communication apparatuses connected to the second port 51-2. Alternatively, the network connection information is information concerning the lines of communication apparatuses integrated as one line of communication apparatuses. The lines of communication apparatuses also include a connection relation among the ports of the communication apparatuses in the network.

The apparatus-information acquiring unit 64 acquires the "SA" 2422 and the "own apparatus information" 2429 from the network presence check response frame 2420 received from the slave stations and stores, in the apparatus-information storing unit 65, apparatus information in which MAC addresses of the slave stations, models of the communication apparatuses, and the like are associated. As the "own apparatus information" 2429, for example, an apparatus model name and an apparatus manufacturer can be exemplified. The apparatus-information acquiring unit 64 also has a function of acquiring an MAC address and apparatus information of the own apparatus (the master station) and storing the MAC address and the apparatus information in the apparatus-information storing unit 65.

Figure 25:
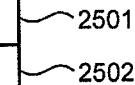
FIG. 25 is a table of an example of apparatus information.

The apparatus-information storing unit 65 stores MAC addresses of the communication apparatuses included in the communication system and the "own apparatus information" 2429 of the communication apparatuses. FIG. 25 is a table of an example of apparatus information. The apparatus information includes "MAC address" of communication apparatuses and "apparatus model name" and "apparatus manufacturer" serving as own apparatus information.

After the network presence check processing by the network-presence-check processing unit 62, the token-circulation-order determining unit 66 performs, using the network connection information stored in the network-connection-information storing unit 63, processing for forming a logical ring, i.e., processing for determining circulation order of a token frame. The circulation order of the token frame can be determined in any method. However, for example, the logical ring is constructed such that the number of communication apparatuses that the token frame, which is a transmission right, passes while circulating once is minimized (when a cable connecting two communication apparatuses (including a switching hub) is referred to as transmission line, the number of transmission lines through which the token passes while circulating once is minimized). As a method of determining circulation order of the token frame that satisfies such a condition, the communication apparatuses only have to be connected by drawing in a single stroke in the network belonging to the same segment. As processing for determining token circulation order by the method of drawing in a single stroke, a method same as the method explained in the first embodiment can be used. The determined circulation order of the token frame is stored in the token-circulation-order-information storing unit 67 as token circulation order information.

When the token circulation order information is determined by the token-circulation-order determining unit 66, the setup processing unit 68 generates, using the token circulation order information, with respect to each of communication apparatuses (slave stations) in the communication system, a setup frame including information concerning a communication apparatus to which the transmission right is given next to the communication apparatus and transmits the setup frame to the communication apparatus. The setup processing unit 68 determines whether setup response frames, which are responses to the setup frame, are received from all the communication apparatuses. When the setup response frames are received from all the communication apparatuses, the setup processing unit 68 notifies the token-frame processing unit 69 to that effect.

Whether the setup frames are received from all the communication apparatuses can be checked by, for example, setting flags indicating that the setup response frames has been received in corresponding slaves of the network connection information of the network-connection-information storing unit 63.

When the token-frame processing unit 69 receives, from the setup processing unit 68, the notification to the effect that the setup response frames have been received from all the communication apparatuses in the communication system, the token-frame processing unit 69 generates a token frame according to the token circulation order information of the token-circulation-order-information storing unit 67 and transmits the token frame from a port of the own station.

When the token-frame processing unit 69 receives a token frame transmitted from another communication apparatus, the token-frame processing unit 69 determines whether the token frame is a token frame that gives the transmission right to the own station. When the token frame is a token frame that gives the transmission right to the own station as a result of the determination, transmission processing for a data frame by the data-frame-communication processing unit 70 is performed. After the transmission processing for the data frame, the token-frame processing unit 69 transmits, based on the token circulation order information, the token frame such that the token frame is acquired by a communication apparatus that obtains the transmission right next. When the token frame is not the token frame that gives the transmission right to the own station, the token-frame processing unit 69 determines that the own station does not obtain the transmission right yet and transfers (repeats) the received token frame from another port, which is not the port in which the token frame was received.

The data-frame-communication processing unit 70 performs transmission and reception processing for the data frame. For example, in the FA network shown in FIG. 22, a controller such as a programmable controller connected to the master station X calculates, at a predetermined period, data to be set in the slave stations A to C, converts the data into a data frame, and transmits the data frame to the slave stations A to C. The data-frame-communication processing unit 70 also has a function of receiving data frames transmitted from the slave stations A to C and transferring (repeating) data frames addressed to another slave station by the slave stations A to C.

In the frame type information 2415 and 2425 of the frames shown in FIGS. 24-1 and 24-2, "TestData", "TestDataACK", and the like are stored to identify the respective frames as explained above. However, numerical values for uniquely identifying the respective frames can be set for the frames and stored in the frame type information 2415 and 2425.

FIG. 23-2 is a schematic block diagram of a functional configuration of a slave station. The slave station includes ports 81-1 and 81-2 for connecting an Ethernet (registered trademark) between the slave station and the communication apparatus (the master station, the slave station, or the hub) adjacent thereto and a communication processing unit 90 that performs transmission and reception processing for a frame via the ports 81-1 and 81-2.

As in the master station, for example, the ports include two ports: the first port 81-1 and the second port 81-2. The two ports 81-1 and 81-2 are connected to another communication apparatus.

The communication processing unit 90 includes a control-frame response unit 91, a token-circulation-destination-information storing unit 92, a token-frame processing unit 93, and a data-frame-communication processing unit 94.

The control-frame response unit 91 performs a response to a control frame such as the network presence check frame 2410 or the setup frame from the master station. For example, when the control-frame response unit 91 receives the network presence check frame 2410, the control-frame response unit 91 generates the network presence check response frame 2420 shown in FIG. 24-2 and returns the network presence check response frame 2420 to the master station. When the control-frame response unit 91 receives a setup frame addressed to the own station, the control-frame response unit 91 acquires, from the setup frame, token circulation destination information indicating a communication apparatus to which the token frame is transmitted next, stores the token circulation destination information in the token-circulation-destination-information storing unit 92, generates a setup response frame, and returns the setup response frame to the master station. In the fifth embodiment, a frame exchanged between the master station and the slave station during the network presence check processing and the logical ring configuration processing is referred to as control frame. A frame transmitted by acquiring the token frame after a logical ring is formed is referred to as data frame.

Further, the control-frame response unit 91 has a function of reforming a frame and transmitting the frame or simply repeating the frame according to a frame type of a control frame received from the master station or another slave station. For example, when the control-frame response unit 91 receives the network presence check frame 2410 from the master station or another slave station, the control-frame response unit 91 performs processing for rewriting the SA 2412 shown in FIG. 24-1 of the received network presence check frame and the transmission port information 2417 of the network presence check frame of the own station in the data 2414, reforms the network presence check frame, and outputs the network presence check frame from a port other than a port in which the control frame was received.

Further, for example, the control-frame response unit 91 also has a function of, when the control-frame response unit 91 receives a control frame including the setup frame from the master station, or the network presence check response frame 2420 or the setup response frame from another slave station, not performing any processing for the frame and simply repeating the frame.

The token-circulation-destination-information storing unit 92 stores an MAC address of a communication apparatus that obtains the transmission right next to the own communication apparatus (slave station). As explained above, the MAC address is acquired from the setup frame received from the master station. It is assumed that the token-circulation-destination-information storing unit 92 stores only an MAC address of a communication apparatus to which the token should be transmitted next. Consequently, it is made possible to set a data amount smaller compared with the token circulation order information kept by the master station.

When the token-frame processing unit 93 receives a token frame transmitted from another communication apparatus, the token-frame processing unit 93 determines whether the token frame is a token frame that gives the transmission right to the own station. When the token frame is a token frame that gives the transmission right to the own station as a result of the determination, transmission processing for a data frame by the data-frame-communication processing unit 94 is performed. After the transmission processing for the data frame, the token-frame processing unit 93 transmits, based on the token circulation order information, the token frame such that the token frame is acquired by a communication apparatus that obtains the transmission right next. When the token frame is not the token frame that gives the transmission right to the own station, the token-frame processing unit 93 determines that the own station does not obtain the transmission right yet and transfers (repeats) the received token frame from another port, which is not the port in which the token frame was received.

The data-frame-communication processing unit 94 performs transmission and reception processing for the data frame. Specifically, the data-frame-communication processing unit 94 performs transmission and reception processing for the data frame between the own station and the master station or the other slave stations.

Figure 26:
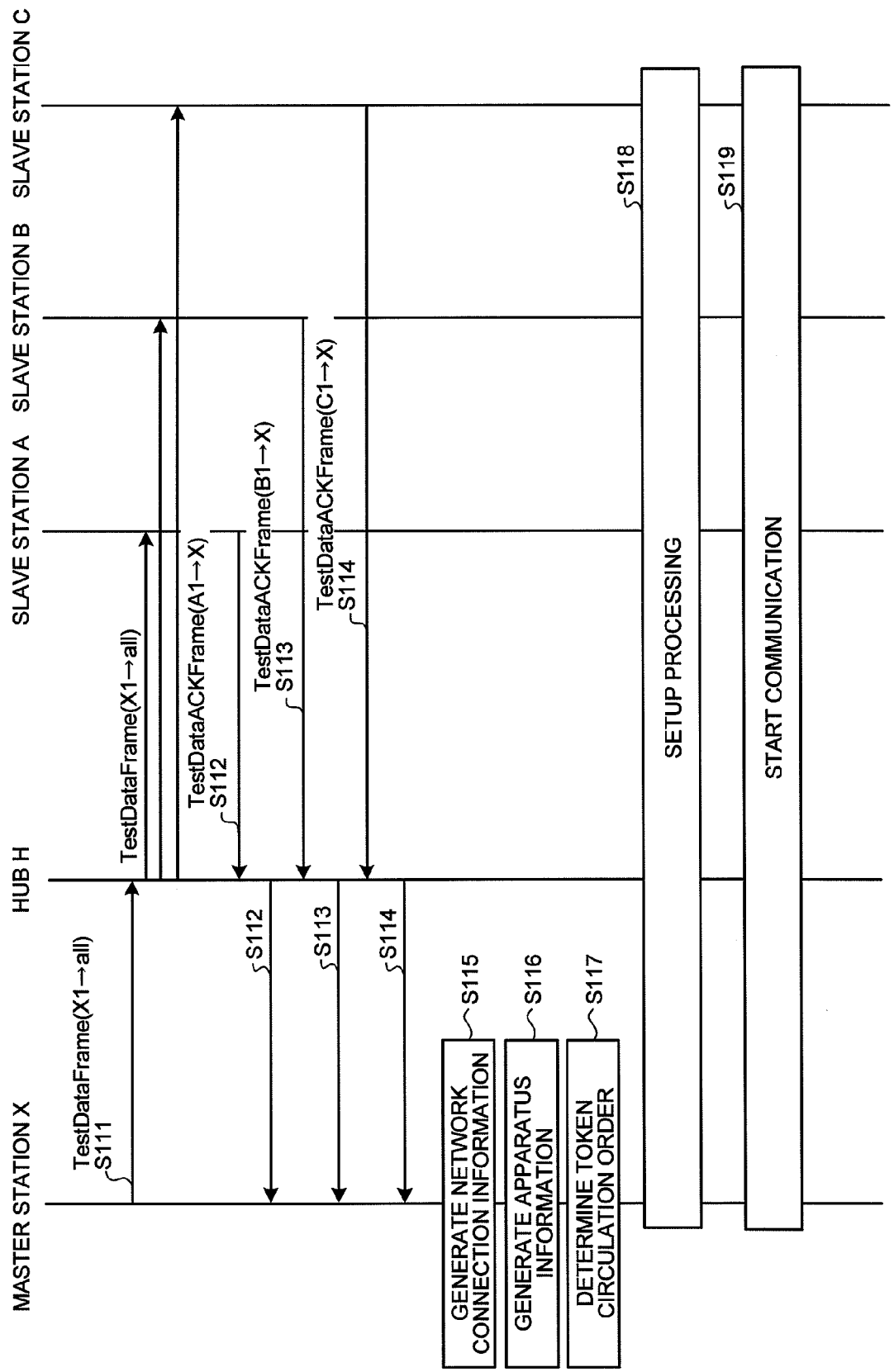
FIG. 26 is a sequence chart of an example of a communication method during start according to the fifth embodiment.

A communication method including a network connection checking method in such a communication system is explained. FIG. 26 is a sequence chart of an example of the communication method at the starting time according to the fifth embodiment. As shown in FIG. 22, a configuration in which the master station X and the three slave stations A to C are corrected to the hub H in a star shape is shown. However, this is an exemplification. Even when an arbitrary number of slave stations are connected to the master station X via the hub H or when slave stations are further connected to other ports of the master station and the slave stations, data communication can be performed by a method same as processing explained below.

First, after the master station X and the slave stations A to C are connected by an Ethernet (registered trademark) cable, power supplies for the slave stations A to C are turned on. In this state, the slave stations A to C are in a reception waiting state for a network presence check frame from the master station X.

Thereafter, when a power supply for the master station X is turned on, the master station X performs processing explained below to recognize slave stations connected on a network of the same segment including the master station X. First, after starting the timer 61, the network-presence-check processing unit 62 of the communication processing unit 60 of the master station X generates a network presence check frame and transmits the generated network presence check frame (in the figure, represented as TestDataFrame (X1→all) by "broadcast" from all the ports X1 and X2 (step S111). In this example, because a transmission line is not connected to the second port X2 of the master station X, the network presence check frame is transmitted from the first port X1.

FIG. 27 is a diagram of an example of the network presence check frame. In a network presence check frame 2701 transmitted from the first port X1 of the master station X, a broadcast address (e.g., in 2-byte representation, "FFFF (all F)") is set in "DA", the MAC address "100" of the master station X is set in "SA", "TestData" is stored in "frame type information", the MAC address "100" of the own station is stored in "MAC address information of the master station", and "X1" indicating the first port is set in "transmission port information of the network presence check frame of the own station".

First, the network presence check frame reaches the hub H. When the hub H receives the network presence check frame from the first port H1, the hub H transmits the network presence check frame from the second to fourth ports H2 to H4 connected to the other communication apparatuses in the store-and-forward system. As a result, the network presence check frame reaches the slave stations A to C.

The slave station A receives the network presence check frame in the first port A1. The control-frame response unit 91 generates a network presence check response frame and returns the network presence check response frame to the master station X from the first port A1 in which the network presence check frame was received (step S112).

FIG. 28 is a table of an example of the network presence check response frame. In a network presence check response frame 2801 transmitted from the first port A1 of the slave station A, the MAC address "100" is set in "DA", the MAC address "1" of the own station is set in "SA", and "TestDataACK" is stored in "frame type information". "100" and "X1" are respectively set in "SA information in a received network presence check frame" and "port information of a station that transmitted the network presence check frame" with reference to "SA" and "transmission port information of the network presence check frame of the own station" of the received network presence check frame 2701 shown in FIG. 27. Further, the first port "A1" in which the network presence check frame was received is stored in "port information of the own station that received the network presence check frame". "XXX_1, company B", which is an apparatus name and a manufacturer name of the own communication apparatus, is stored in "own apparatus information".

Thereafter, the control-frame response unit 91 of the slave station A generates a network presence check frame obtained by rewriting the network presence check frame 2701 received from the port A1 and attempts to transmit the network presence check frame to the second port A2 other than the first port A1. However, because a transmission line has not been established to the second port A2, the network presence check frame is not transmitted. Thereafter, the slave station A is put in a state of waiting for setting from the master station X.

Similarly, in the slave station B, when the control-frame response unit 91 receives the network presence check frame in the first port B1, the control-frame response unit 91 generates a network presence check response frame 2802 shown in FIG. 28 and transmits the network presence check response frame 2802 to the master station X from the first port B1 (step S113). The control-frame response unit 91 does not transmit the network presence check frame from the second port B2 to which a transmission line has not been established. Thereafter, the slave station B is put in a state of waiting for setting from the master station X.

Similarly, in the slave station C, when the control-frame response unit 91 receives the network presence check frame in the first port C1, the control-frame response unit 91 generates a network presence check response frame 2803 shown in FIG. 28 and transmits the network presence check response frame 2803 to the master station X from the first port C1 (step S114). The control-frame response unit 91 does not transmit the network presence check frame from the second port C2 to which a transmission line has not been established.

Thereafter, the network presence check response frames transmitted from the respective slave stations A to C are repeated by the hub H and transmitted to the master station X (steps S112 to S114). It is assumed that the master station X receives the network presence check response frames from the slave stations A to C, which are communication apparatuses in the network of the same segment, at the starting time of the timer 61 for waiting for a network presence check response frame set at step S111.

Every time the network presence check processing unit 62 of the master station X receives the network presence check response frames from the slave stations A to C at the starting time of the timer 61, the network presence check processing unit 62 generates network presence information from the frames, further generates network connection information, updates the network connection information, and stores the network connection information in the network-connection-information storing unit 63 (step S115).

FIG. 29 is a table of an example of the network presence information generated by the master station. The network presence information includes "SA", "SA information in a received network presence check frame", "port information of the station that transmitted the network presence information and "port information of the own station that received the network presence check frame". The network-presence-check processing unit 62 of the master station X acquires, from the received presence check response frames, the respective kinds of information from areas where the above items are defined.

Figures 1, 30:
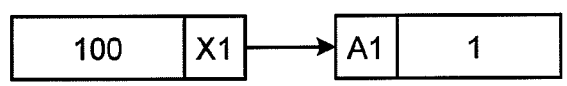
Figures 2, 30:
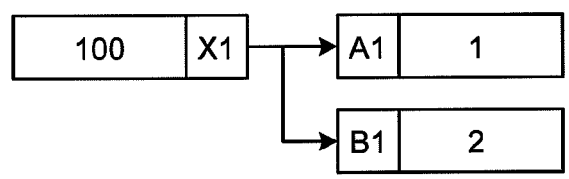
Figures 3, 30:
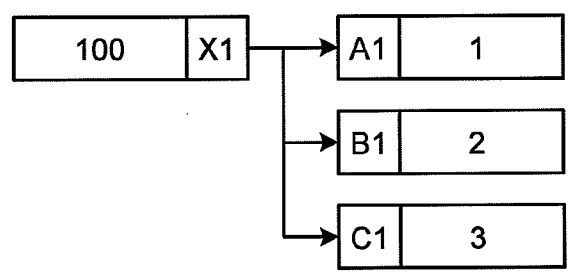

FIGS. 30-1 to 30-3 are schematic diagrams of an example of a procedure of a method of generating network connection information. FIG. 31 is a table of an example of the network connection information. For convenience of explanation, the master station X receives network presence check response frames from the slave station A, the slave station B, and the slave station C in this order.

Network presence information at a point when the network presence check response frame 2801 is received from the slave station A is only a record 2901 shown in FIG. 29. Consequently, the network-presence-check processing unit 62 of the master station X generates network connection information shown in FIG. 30-1. In other words, the network-presence-check processing unit 62 acquires the MAC address "1" stored in "SA" and the port information "A1" stored in "port information of the own station that received the network presence check frame". The network-presence-check processing unit 62 acquires the MAC address "100" stored in "SA information in the received network presence check frame" and the port information "X1" stored in "port information of a station that transmitted a network presence check frame". The network-presence-check processing unit 62 arranges acquired communication apparatuses such that the ports "A1" and "X1" of the acquired communication apparatuses are opposed to each other. The network-presence-check processing unit 62 connects the two ports "A1" and "X1" with a line. This state is shown in FIG. 30-1. The network-presence-check processing unit 62 records these relations, for example, as indicated by a record 3101 of communication connection information shown in FIG. 31. In other words, in two connected communication apparatuses, the network-presence-check processing unit 62 stores "MAC address of the first communication apparatus" and "ports of the first communication apparatus" and "MAC address of the second communication apparatus" and "ports of the second communication apparatus" in association with each other. In the figure, the "port of the first communication apparatus" and the "port of the second communication apparatus" are connected.

At a point when the network presence check response frame 2801 is received from the slave station B, the network-presence-check processing unit 62 performs the same processing and generates network connection information indicating a connection relation between the two communication apparatuses stored in the network presence information shown in FIG. 29. The network-presence-check processing unit 62 establishes a relation shown in FIG. 30-2 to connect the port information "B1" stored in the "port information of the own station that received the network presence check frame" of the MAC address "2" stored in "SA" in a record 2902 of the network presence information shown in FIG. 29 and port information "X1" stored in the "port information of a station that transmitted a network presence check frame" of the MAC address "100" stored in the "SA information in the received network presence check frame". The network-presence-check processing unit 62 generates network connection information from this relation and stores the network connection information as indicated by a record 3102 shown in FIG. 31.

At a point when the network presence check response frame 2801 is received from the slave station C, the network-presence-check processing unit 62 performs the same processing. As a result, a connection relation shown in FIG. 30-3 and network connection information indicated by a record 3103 shown in FIG. 31 are obtained.

When the timer 61 detects timeout, the network connection information shown in FIG. 31 is obtained. Final network connection information is as shown in FIG. 30-3.

Every time the apparatus-information acquiring unit 64 of the master station X receives the network presence check response frame from the slave stations A to C, the apparatus-information acquiring unit 64 generates apparatus information from the frame, stores the apparatus information in the apparatus-information storing unit 65, and registers an MAC address, an apparatus model name, and an apparatus manufacturer of the own station (step S116). The apparatus information generated by the master station X is as shown in FIG. 25. Values input to "SA" and "own apparatus information" of the network presence check response frame are input to "MAC address", "apparatus model name", and "apparatus manufacturer".

Thereafter, determination processing for token circulation order by the token-circulation-order determining unit 66 of the master station X and setup processing for notifying circulation information of the transmission right of the slave stations (information indicating a communication apparatus to which the transmission right is give next to a slave station that received the token frame and acquired the transmission right) by the setup processing unit 68 are performed (steps S117 to S118). In the determination processing for token circulation order explained above, the token circulation order can be determined by an arbitrary method for, for example, calculating the token circulation order with a method of drawing in a single stroke such that the number of communication apparatus that the token frame passes is minimized, for example, in a route starting from the master station X and returning to the master station X. The token-frame processing unit 69 and the data-frame-communication processing unit 70 of the master station X start, based on the token circulation order, communication using the token frame (step S119).

The processing at steps S111 to S117 is the network presence check processing for checking communication apparatuses included in a network and an array state of the communication apparatuses.

Figure 32:
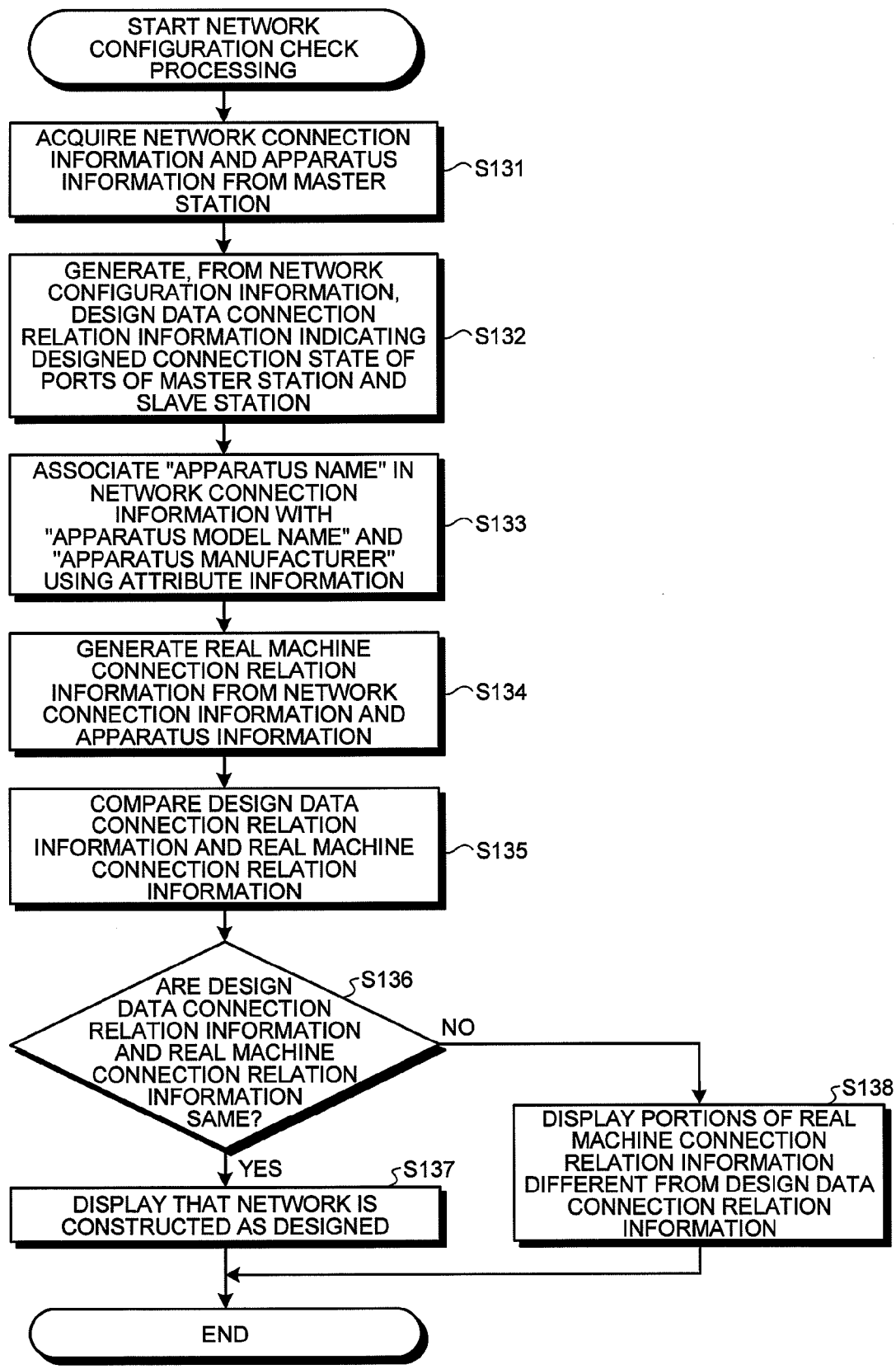
FIG. 32 is a flowchart for explaining an example of a procedure of network configuration check processing according to the fifth embodiment.

A network configuration checking method for checking whether connection of a constructed FA network is performed as designed is explained. FIG. 32 is a flowchart for explaining an example of a procedure of network configuration checking processing according to the fifth embodiment. After the apparatus information is created by the master station X at step S116 in FIG. 26, the network-configuration comparing unit 21 of the network performance estimating apparatus 10A acquires network connection information and apparatus information from the master station X via the communication unit 20 (step S131).

Subsequently, the network-configuration comparing unit 21 generates, using the network configuration information in the network-information storing unit 17, design data connection relation information indicating a connection relation of a designed network (step S132). Specifically, the network configuration information shown in FIG. 5 indicates a connection relation among the master station, the hub, and the slave stations in the network. On the other hand, the network connection information indicates a connection relation of the master station and the slave stations. Therefore, the network-configuration comparing unit 21 performs processing for generating, from the network configuration information, design data connection relation information indicating a connection relation between the communication apparatuses excluding the hub.

FIG. 33 is a table of an example of the design data connection relation information. In the design data connection relation information, a connection state between the master station X and the slave stations A to C or among the slave stations A to C connected via the hub H is shown from the network configuration information shown in FIG. 5 with the hub H omitted. The design data connection relation information includes a host apparatus name, a host apparatus model name, a host apparatus manufacturer, a host apparatus port, a subordinate apparatus name, a subordinate apparatus model name, a subordinate apparatus manufacturer, and a subordinate apparatus port. This is information for representing a connection relation between host apparatuses and subordinate apparatuses including ports.

For example, a record 3301 is generated from the records 501 and 502 of the network configuration information shown in FIG. 5. Specifically, the slave station A connected to the hub H same as the hub H connected to the master station X is extracted from the record 502. Association of the port X1 of the master station X and the port A1 of the slave station A is performed. A record 3302 is generated from the records 502 and 503 of the network configuration information shown in FIG. 5. Specifically, the slave station B connected to the hub H same as the hub H connected to the slave station A is extracted from the record 503. The port A1 of the slave station A and the port B1 of the slave station B are associated with each other. Records in other design data connection relation information are generated in the same manner as the records 3301 and 3302. In all the records, the host apparatus model name, the host apparatus manufacturer, the subordinate apparatus model name, and the subordinate apparatus manufacturer are not input.

Thereafter, the network-configuration comparing unit 21 associates, using the attribute information in the network-information storing unit 17, apparatus names in the records of the design data connection relation information with apparatus model names and apparatus manufacturers (step S133). Specifically, the network-configuration comparing unit 21 acquires, from the attribute information, "apparatus model name" and "apparatus manufacturer" of communication apparatuses specified by the "host apparatus name" and the "subordinate apparatus name" in the design data connection relation information and stores the "apparatus model name" and the "apparatus manufacturer" in the "host apparatus model name" and the "host apparatus manufacturer" or the "subordinate apparatus model name" and the "subordinate apparatus manufacturer".

Figure 34:
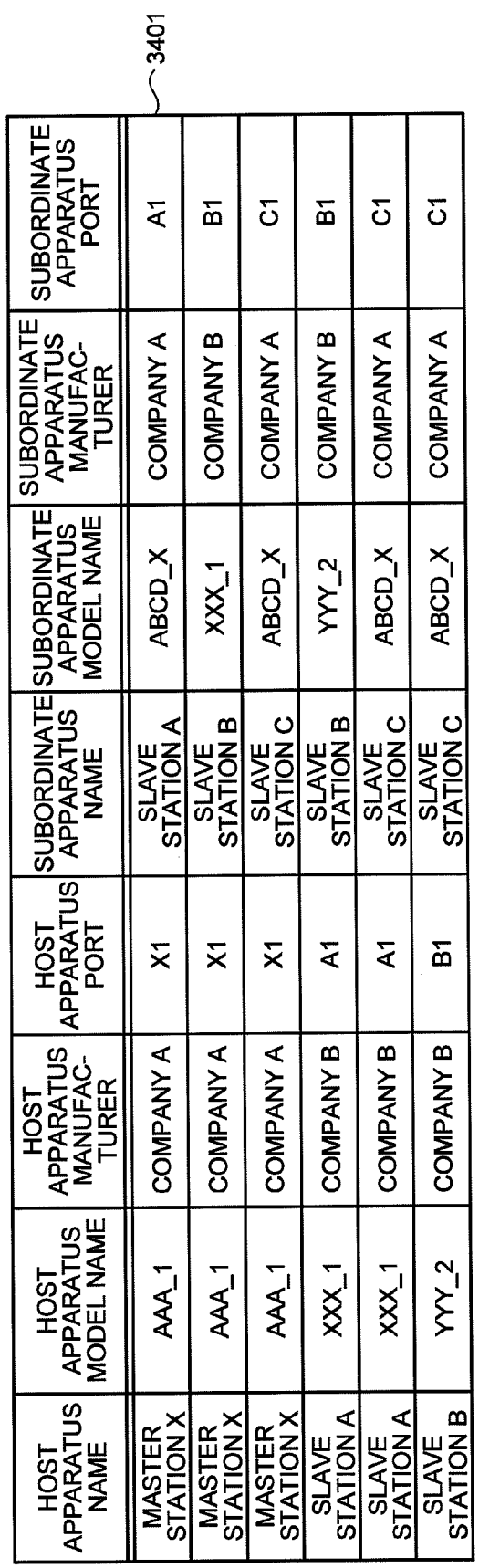
FIG. 34 is a table of the example of the design data connection relation information.

FIG. 34 is a table of an example of the design data connection relation information. In FIG. 34, the state shown in FIG. 33 changes a state in which items of the host apparatus model name, the host apparatus manufacture, the subordinate apparatus model name, and the subordinate apparatus manufacturer have been input. For example, concerning the record 3301 shown in FIG. 33, a record having "master station X", which is "host apparatus name", is searched from the attribute information shown in FIG. 4. As a result of the search, a record 401 of the attribute information shown in FIG. 4 is obtained. "AAA_1" is acquired as "apparatus model name", "company A" is acquired as "apparatus manufacturer", and "company A" is acquired as the "apparatus manufacturer" from the record 401. Similarly, when a record having "slave station A", which is the "subordinate apparatus name", in the apparatus name is searched from the attribute information in FIG. 4, a record 402 shown in FIG. 4 is obtained. Consequently, "XXX_1" is acquired as "model name" and "company B" is acquired as the "apparatus manufacturer". These kinds of acquired information are stored in items corresponding thereto of the design data connection relation information, whereby a record 3401 shown in FIG. 34 are obtained. In this way, the same processing is applied to all the records in the design data connection relation information.

Subsequently, the network-configuration comparing unit 21 generates real machine connection relation information from the network connection information and the apparatus information acquired from the master station (step S134). Specifically, because the network connection information includes MAC addresses and port information, the network-configuration comparing unit 21 generates real machine connection relation information in which the MAC addresses of the network connection information are associated with apparatus model names and apparatus manufacturers.

FIG. 35 is a table of an example of the real machine connection relation information. The real machine connection relation information includes an MAC address of a first communication apparatus, an apparatus model name of the first communication apparatus, a manufacturer of the first communication apparatus, a port of the first communication apparatus, a MAC address of a second communication apparatus, an apparatus model name of the second communication apparatus, a manufacturer of the second communication apparatus, and a port of the second communication apparatus. This information is information for representing a connection relation including ports between the first communication apparatus and the second communication apparatus in an actually-constructed network.

For example, the network-configuration comparing unit 21 searches for a record having "1", which is "MAC address of the first communication apparatus" of the record 3101 of the network connection information shown in FIG. 31, in a MAC address from the apparatus information shown in FIG. 25. As a result, a record 2502 shown in FIG. 25 is obtained. The network-configuration comparing unit 21 acquires "XXX_1" as "apparatus model name" and acquires "company B" as "apparatus manufacturer" from the record 2502. Similarly, when the network-configuration comparing unit 21 searches a record having "100", which is "MAC address of the second communication apparatus", in an apparatus name from the apparatus information shown in FIG. 25, a record 2501 shown in FIG. 25 is obtained. Consequently, the network-configuration comparing unit 21 acquires "AAA_1" as "apparatus model name" and acquires "company A" as "apparatus manufacturer". The network-configuration comparing unit 21 stores these kinds of acquired information in corresponding items of the real machine connection relation information, whereby a record 3501 shown in FIG. 35 is obtained.

Thereafter, the network-configuration comparing unit 21 compares design data connection relation information and the real machine connection relation information (step S135) and determines whether the design data connection relation information and the real machine connection information coincide with each other (step S136). For example, the network-configuration comparing unit 21 performs, concerning all the records, processing for extracting, from the design data connection relation information, a record coinciding with a combination of values of "apparatus model name of the first communication apparatus", "manufacturer of the first communication apparatus", "port of the first communication apparatus", "apparatus model name of the second communication apparatus", and "manufacturer of the second communication apparatus" of one record of the real machine connection relation information shown in FIG. 35 and determining whether a value of "host apparatus port" or "subordinate apparatus port" of the record is the same as a value of "port of the second communication apparatus" of the record of the real machine connection relation information.

When the design data connection relation information and the real machine connection relation information coincide with each other (Yes at step S136), the network-configuration comparing unit 21 displays, on the display unit 12, information indicating that a network has been constructed as designed (step S137). The processing ends. When the design data connection relation information and the real machine connection relation information do not coincide with each other (No at step S136), the network-configuration comparing unit 21 displays, on the display unit 12, sections of the real machine connection relation information different from the design data connection relation information (step S138). At step S138, the network-configuration comparing unit 21 can arrange the real machine connection relation information shown in FIG. 35 and the design data connection relation information shown in FIG. 34 side by side like an erratum, highlight the different sections on the display unit 12, create the network configuration diagram shown in FIG. 3, and highlight, on the display unit 12, sections different from the design data connection relation information in the sections. In this way, the network configuration checking method ends.

In the fifth embodiment, the network performance estimating apparatus 10A is connected to an actually-constructed network. Network connection information is acquired from the master station that grasps a connection state of the communication apparatuses connected in the network. The design data connection relation information generated from the network configuration information of the network-information storing unit 17 and the real machine connection relation information generated from the network connection information and the apparatus information are compared. As a result, there is an effect that it is possible to determine whether a constructed network is same as the configuration of a designed network. When the constructed network is different from the configuration of the designed network, different sections are extracted and displayed. Therefore, it is possible to clearly show the user which section is different from design. Consequently, there is an effect that the user can easily grasp a correction section of the constructed network and it is easy to construct a network having a configuration same as the configuration of the designed network.

Sixth Embodiment

In this sixth embodiment, as in the fifth embodiment, a network performance estimating apparatus and a network configuration checking method that can determine whether a network configuration created by the network performance estimating apparatus and a network configuration actually assembled by a user coincide with each other are explained. Further, a communication managing apparatus and a data communication method for obtaining connection information of a constructed network necessary for comparison of network configurations are explained.

Figure 36:
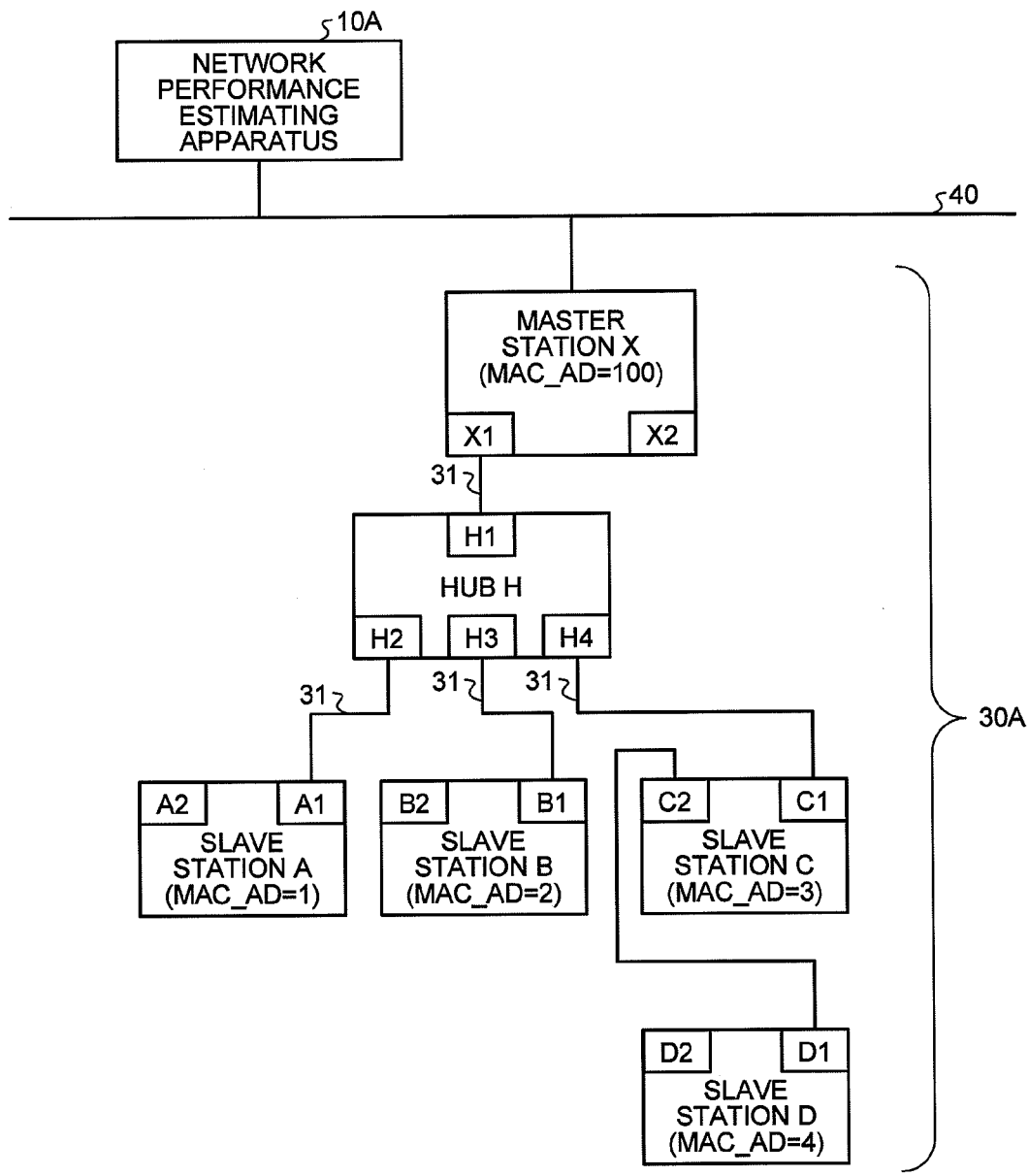
FIG. 36 is a schematic diagram of an example of a state in which the network performance estimating apparatus and the FA network are connected.

FIG. 36 is a schematic diagram of an example of a state in which the network performance estimating apparatus and an FA network are connected. As shown in the figure, the network performance estimating apparatus 10A and an FA network 30A are connected via the network 40. In the figure, in the FA network 30 shown in FIG. 22 in the fifth embodiment, a slave station D, an MAC address of which is "4", is further linearly connected to the slave station C. In the figure, a first port D1 of the slave station D and the second port C2 of the slave station C are connected. The configurations of the network performance estimating apparatus 10A, the master station X, and the slave stations A to D used in the sixth embodiment are the same as those in the fifth embodiment. Therefore, explanation of the configurations is omitted.

An overview of a communication method including a network connection checking method in the communication system is explained. The details of the communication method are explained in the fifth embodiment. Therefore, only necessary sections are explained in detail. In other sections, an overview is explained.

First, after the master station X and the slave stations A to D are connected by the Ethernet (registered trademark) cable 31, when power supplies for the slave stations A to D are turned on and a power supply for the master station X is turned on, the network-presence-check processing unit 62 of the communication processing unit 60 of the master station X generates a network presence check frame and transmits the generated network presence check frame by "broadcast" from all the ports X1 and X2.

FIG. 37 is a table of an example of the network presence check frame. In a network presence check frame 3701 transmitted from the first port X1 of the master station X, a broadcast address is set in "DA", the MAC address "100" of the master station X is set in "SA", "TestData" is stored in "frame type information", the MAC address "100" of the own station is stored in "MAC address information of the master station", and "X1" indicating the first port is set in "transmission port information of the network presence check frame of the own station".

First, the network presence check frame 3701 reaches the hub H. When the hub H receives the network presence check frame from the first port H1, the hub H transmits the network presence check frame from the second to fourth ports H2 to H4 connected to the other communication apparatuses in the store-and-forward system. As a result, the network presence check frame 3701 reaches the respective slave stations A to C.

The slave stations A to C receive the network presence check frame in the respective first ports A1 to C1. The control-frame response units 91 generate network presence check response frames and return the network presence check response frames to the master station X from the respective first ports A1 to C1 in which the network presence check frame 3701 was received.

FIG. 38 is a table of an example of the network presence check response frame. In a network presence check response frame 3801 transmitted from the first port A1 of the slave station A, "100" acquired from "MAC address information of the master station X" of the received network presence check frame 3701 is set in "DA", the MAC address "1" of the own station is set in "SA", and "TestDataACK" is stored in "frame identification information". "100" and "X1" are respectively set in "SA information in a received network presence check frame" and "port information of a station that transmits the network presence check frame" with reference to "SA" and "transmission port information of the network presence check frame of the own station" of the received network presence check frame 3701 shown in FIG. 37. Further, the first port "A1" in which the network presence check frame was received is stored in "port information of the own station that received the network presence check frame". "XXX_1, company B", which is an apparatus name and a manufacturer name of the own communication apparatus is stored in "own apparatus information". Similarly, the slave stations B and C generate and transmit network presence check response frames 3802 and 3803. Thereafter, the network presence check response frames 3801 to 3803 transmitted from the respective slave stations A to C are repeated by the hub H and transmitted to the master station X.

Thereafter, because transmission lines have not been established to the second ports A2 and B2 other than the first ports A1 and B1, the control-frame response units 91 of the slave stations A and B do not attempt transmission of the network presence check frame in the second ports A2 and B2. However, the control-frame response unit 91 of the slave station C generates a network presence check frame 3702 obtained by rewriting the network presence check frame 3701 received from the first port C1 and transmits the network presence check frame 3702 from the second port C2 because a transmission line has been established to the second port C2.

As shown in FIG. 37, the control-frame response unit 91 generates the network presence check frame 3702 obtained by rewriting "SA" and "transmission port information of the network presence check frame of the own station" in the received network presence check frame 3701. Specifically, the control-frame response unit 91 generates the network presence check frame 3702 in which a broadcast address is set in "DA", an MAC address "3" of the own slave station C is set in "SA", "TestData" is stored in "frame type information", the MAC address "100" of the master station X is stored in "MAC address information of the master station", and "C2" indicating the second port is set in "transmission port information of the network presence check frame of the own station".

The network presence check frame 3702 transmitted from the slave station C reaches the slave station D. The slave station D receives the network presence check frame 3702 in the first port D1. The control-frame response unit 91 generates a network presence check response frame 3804 and returns the network presence check response frame 3804 to the master station X from the first port D1 in which the network presence check frame 3702 was received.

As shown in FIG. 38, in the network presence check response frame 3804 transmitted from the first port D1 of the slave station D, "100" acquired from "MAC address information of the master station X" of the received network presence check frame 3702 is set in "DA", an MAC address "4" of the own station is set in "SA", and "TestDataACK" is stored in "frame type information". "3" and "C2" are respectively set in "SA information in a received network presence check frame" and "port information of a station that transmitted the network presence check frame" with reference to "SA" and "transmission port information of the network presence check frame of the own station" of the received network presence check frame 3702 shown in FIG. 37. Further, the first port "D1" in which the network presence check frame is received is stored in "port information of the own station that received the network presence check frame". "ABCD_X, company A", which is an apparatus name and a manufacturer name of the own communication apparatus is stored in "own apparatus information".

Thereafter, the network presence check response frame 3804 transmitted from the slave station D is repeated by the hub H and transmitted to the master station X.

Every time the network-presence-check processing unit 62 of the master station X receives the network presence check response frames 3801 to 3804 from the slave stations A to D at the starting time of the timer 61, the network-presence-check processing unit 62 generates network presence information from the frames, further generates network connection information and updates the network connection information, and stores the network connection information in the network-connection-information storing unit 63.

FIG. 39 is a table of an example of the network presence information generated by the master station. Compared with the network presence information shown in FIG. 29, a record 3901 concerning the slave station D has been added. Specifically, in the record 3901 concerning the slave station D, "SA" is "4", "port information of a station that transmits the network presence check frame" is "C2", and "port information of the own station that received the network presence check frame" is "D1".

Figures 40, 41:
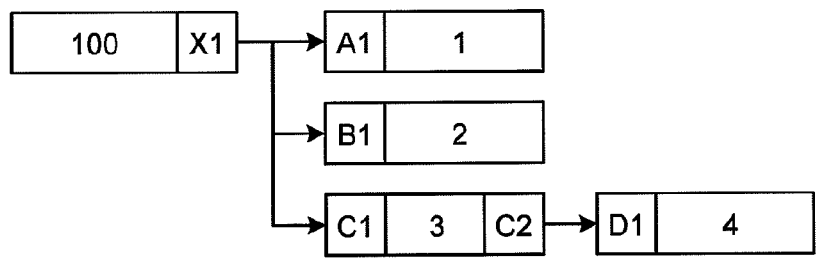
FIG. 40 is a schematic diagram of an example of a connection relation among communication apparatuses in the network.
FIG. 41 is a table of an example of network connection information.

FIG. 40 is a schematic diagram of an example of a connection relation among the communication apparatuses in the network. FIG. 41 is a table of an example of the network connection information. The network-presence-check processing unit 62 of the master station X grasps the connection relation among the communication apparatuses shown in FIG. 40 using the network presence information shown in FIG. 39 and generates the network connection information shown in FIG. 41. A record 4104 indicating a connection relation between the slave station C and the slave station D has been added to FIG. 31 in the fifth embodiment. In this example, when the timer 61 detects timeout, the network connection information shown in FIG. 41 is obtained.

Every time the apparatus-information acquiring unit 64 of the master station X receives network presence check response frames from the slave stations A to D, the apparatus-information acquiring unit 64 generates apparatus information from the frames, stores the apparatus information in the apparatus-information storing unit 65, and registers an MAC address, an apparatus model name, and an apparatus manufacturer of the own station. FIG. 42 is a table of an example of the apparatus information. In the apparatus information, a record 4205 concerning the slave station D is added to FIG. 25 in the fifth embodiment.

Thereafter, determination processing for token circulation order by the token-circulation-order determining unit 66 of the master station X and setup processing for notifying circulation information of the transmission right of the slave stations (information indicating a communication apparatus to which the transmission right is given next to a slave station that received the token frame and acquired the transmission right) by the setup processing unit 68 are performed. Thereafter, the token-frame processing unit 69 and the data-frame-communication processing unit 70 of the master station X start, based on the token circulation order, communication using the token frame.

An overview of a network configuration checking method for checking whether connection of a constructed FA network is performed as designed is explained. Network configuration checking processing is performed according to the flowchart in FIG. 32 in the fifth embodiment. First, the network-configuration comparing unit 21 of the network performance estimating apparatus 10A acquires the network connection information shown in FIG. 41 and the apparatus information shown in FIG. 42 from the master station X via the communication unit 20.

Subsequently, the network-configuration comparing unit 21 generates, using the network configuration information in the network-information storing unit 17, design data connection relation information indicating a connection relation of a designed network. FIG. 43 is a table of an example of the network configuration information. In the network configuration information, a record 4305 indicating a connection relation between the slave station C and the slave station D has been added to FIG. 5 in the first embodiment.

FIG. 44 is a table of an example of the design data connection relation information. In the design data connection relation information, a connection state between the master station X and the slave stations A to C, among the slave stations A to C, or between the slave stations C and D connected via the hub H is shown from the network configuration information shown in FIG. 5 with the hub H omitted. In the design data connection relation information, a record 4407 indicating a connection relation between the slave station C and the slave station D has been added to FIG. 33 in the fifth embodiment. A method of generating the design data connection relation information has already been explained. Therefore, explanation of the method is omitted.

Thereafter, the network-configuration comparing unit 21 associates apparatus names in the record of design data connection relation information with apparatus model names and apparatus manufacturers using the attribute information shown in FIG. 4. FIG. 45 is a table of an example of the design data connection relation information. FIG. 45 is in a state in which the items of the host apparatus model name, the host apparatus manufacturer, the subordinate apparatus model name, and the subordinate apparatus manufacturer are input in the state shown in FIG. 44.

Subsequently, the network-configuration comparing unit 21 generates real machine connection relation information from the network connection information shown in FIG. 41 and the apparatus information shown in FIG. 42 acquired from the master station. FIG. 46 is a table of an example of the real machine connection relation information. In the real machine connection relation information, a record 4604 indicating the connection relation between the slave station C and the slave station D has been added to FIG. 35 in the fifth embodiment. A method of generating the real machine connection relation information is already explained. Therefore, explanation of the method is omitted.

Thereafter, the network-configuration comparing unit 21 performs, concerning all the records, processing for comparing the design data connection relation information shown in FIG. 45 and the real machine connection relation information shown in FIG. 46 using, for example, the method explained in the fifth embodiment and determining whether the design data connection relation information and the real machine connection relation information coincide with each other.

When the design data connection relation information and the real machine connection relation information coincide with each other, the network-configuration comparing unit 21 displays, on the display unit 12, information indicating that a network is constructed as designed, and the processing ends. When the machine connection relation information and the real machine connection relation information do not coincide with each other, the network-configuration comparing unit 21 displays sections of the real machine connection relation information different from the design data connection relation information on the display unit 12, and the network configuration checking method ends.

In the sixth embodiment, the network includes not only the connection relation of the star shape via the hub but also the connection relation of the linear shape. In such a case, an effect same as the effect in the fifth embodiment can be obtained.

The network performance estimating method and the network configuration checking method explained above can be realized by executing, with a computer (an information processing apparatus) such as a personal computer or a work station including a CPU, a computer program in which processing procedures of the methods are written. In this case, the CPU (control means) of the computer executes the processing steps of the network performance estimating method or the network configuration checking method according to the computer program. The computer programs are recorded in a computer-readable recording medium such as a hard disk, a floppy (registered trademark) disk, a CD (Compact Disk)-ROM (Read Only Memory), an MO (Magneto-Optical disk), or a DVD (Digital Versatile Disk or Digital Video Disk) and executed by being read out from the recording medium by the computer. The computer programs can also be distributed via a network (a communication line) such as the Internet.

The data communication method in the master station and the slave stations can be realized by executing, with a computer such as a programmable controller or a personal computer including a CPU, a computer program in which the processing procedures of the method are written. In this case, the CPU (control means) of the computer executes the processing steps of the data communication method according to the computer program. The computer program is recorded in a computer-readable recording medium such as a hard disk, a floppy (registered trademark) disk, a CD-ROM, a MO, or a DVD and executed by being read out from the recording medium by the computer. The computer program can also be distributed via a network (a communication line) such as the Internet.

Further, the master station can be a communication managing circuit in which the processing units described in the embodiments are realized by a circuit that executes the processing according to the processing procedure explained above. Similarly, the slave station can be a communication circuit in which the processing units described in the embodiments are realized by a circuit that executes the processing according to the processing procedure explained above.

Furthermore, the master station can be an LSI (Large-Scale Integration) in which the processing units described in the embodiments are manufactured to execute the processing according to the processing procedure explained above. Similarly, the slave station can be an LSI in which the processing units described in the embodiments are manufactured to execute the processing according to the processing procedure explained above.

The communication-apparatus-peculiar-information storing unit 13 is drawn to be stored in storing means in the network performance estimating apparatus 10 or 10A. However, the communication-apparatus-peculiar-information storing unit 13 can be a portable storage medium such as a USB (Universal Serial Bus) memory in which the peculiar information of the communication apparatuses are stored, or can be a server apparatus in which the peculiar information of the communication apparatuses are stored. The network performance estimating apparatus 10 or 10A can be connected to the server apparatus via a network.

INDUSTRIAL APPLICABILITY

As explained above, the network performance estimating apparatus according to the present invention is useful for performing an estimation of performance of an FA network in which real-time properties are guaranteed.

REFERENCE SIGNS LIST 10, 10A NETWORK PERFORMANCE ESTIMATING APPARATUSES
11 INPUT UNIT
12 DISPLAY UNIT
13 COMMUNICATION-APPARATUS-PECULIAR-INFORMATION STORING UNIT
14 NETWORK-CONFIGURATION DEPICTING UNIT
15 COMMUNICATION-APPARATUS-ATTRIBUTE-INFORMATION ACQUIRING UNIT
16 TOKEN-CIRCULATION-ORDER DETERMINING UNIT
17 NETWORK-INFORMATION STORING UNIT
18 PERFORMANCE ESTIMATING UNIT
19 CONTROL UNIT
20 COMMUNICATION UNIT
21 NETWORK-CONFIGURATION COMPARING UNIT
30 FA NETWORK
31 TRANSMISSION LINE
40 NETWORK
51-1, 51-2, 81-1, 81-2 PORTS
60 COMMUNICATION PROCESSING UNIT
61 TIMER
62 NETWORK-PRESENCE-CHECK PROCESSING UNIT
63 NETWORK-CONNECTION-INFORMATION STORING UNIT
64 APPARATUS-INFORMATION ACQUIRING UNIT
65 APPARATUS-INFORMATION STORING UNIT
66 TOKEN-CIRCULATION-ORDER DETERMINING UNIT
67 TOKEN-CIRCULATION-ORDER-INFORMATION STORING UNIT
68 SETUP PROCESSING UNIT
69 TOKEN-FRAME PROCESSING UNIT
70 DATA-FRAME-COMMUNICATION PROCESSING UNIT
90 COMMUNICATION PROCESSING UNIT
91 CONTROL-FRAME RESPONSE UNIT
92 TOKEN-CIRCULATION-DESTINATION-INFORMATION STORING UNIT
93 TOKEN-FRAME PROCESSING UNIT
94 DATA-FRAME-COMMUNICATION PROCESSING UNIT

The invention claimed is:

1. A network performance estimating apparatus comprising:
a communication-apparatus-peculiar-information storing unit configured to store information;
a network-configuration depicting unit configured to generate, from a network designed by a user by connecting ports of a plurality of communication apparatuses with wires, network configuration information indicating a connection relation of the ports among the communication apparatuses and store, in the communication-apparatus-peculiar-information storing unit, concerning the communication apparatuses in the designed network, as attribute information, apparatus identification information including peculiar information for each communication apparatus name and apparatus type of the communication apparatuses input by the user;
a communication-apparatus-attribute-information acquiring unit configured to acquire, concerning the communication apparatuses in the attribute information, communication performance of the communication apparatuses specified by the apparatus identification information from communication apparatus peculiar information in which the peculiar information and communication performance for each apparatus type are stored in association with each other concerning the communication apparatuses;
a token-circulation-order determining unit configured to determine, from the network configuration information, token circulation order indicating order of the communication apparatuses in which a token frame is circulated in the designed network; and
a performance estimating unit configured to calculate communication performance of the designed network using the token circulation order and the communication performance of the communication apparatuses.

2. The network performance estimating apparatus according to claim 1, wherein
the communication apparatuses include a communication managing apparatus configured to manage communication of the network in cyclic communication, a slave station configured to receive data from the communication managing apparatus and perform transmission of data when the slave station receives the token frame and obtains a transmission right, and a switching hub configured to perform connection between the communication managing apparatus and the slave station or a plurality of the slave stations and provided according to necessity,
the communication-apparatus-attribute-information acquiring unit acquires, concerning the slave station, a token hold time, which is a time for holding the token frame, from the communication apparatus peculiar information and acquires, concerning the switching hub, a delay time from the communication apparatus peculiar information, and
the performance estimating unit adds up, in order of the token circulation order, the token hold times of the slave stations and delay times of a plurality of the switching hubs and calculates a token circulation time serving as communication performance of the network.

3. The network performance estimating apparatus according to claim 2, wherein
when the communication apparatuses connected under the communication managing apparatus are expanded in a tree shape, the token-circulation-order determining unit selects, in order of turning around the tree from the communication managing apparatus, the communication apparatuses connected in the tree shape and determines the token circulation order,
the performance estimating unit calculates, from the token circulation order, a number of times the token frame passes a same hub and calculates, as the token circulation time, a sum of the token hold times of the slave stations and a product of the delay times and the number of times of passing concerning the hubs.

4. The network performance estimating apparatus according to claim 2, further comprising a network information storing unit configured to store information, wherein
the network-configuration depicting unit further stores, in the network information storing unit, concerning the designed network, as system information, transmission speed of a system input by the user,
the communication-apparatus-attribute-information acquiring unit further acquires, concerning the slave station, an output data amount, which is a maximum data amount that can be processed by the slave station, from the communication apparatus peculiar information, and
when attribute information corresponding to the switching hub is absent in the communication apparatus peculiar information, the performance estimating unit calculates the delay time of the switching hub in the token circulation order as a value obtained by dividing, by transmission speed of the system, a sum of the output data amount of the slave station arranged immediately before the hub in the token circulation order and the token frame.

5. The network performance estimating apparatus according to claim 1, wherein
the communication apparatuses include a communication managing apparatus configured to manage communication of the network in cyclic communication, a slave station configured to receive data from the communication managing apparatus and perform transmission of data when the slave station receives the token frame and obtains a transmission right, and a switching hub configured to perform connection between the communication managing apparatus and the slave station or a plurality of the slave stations and provided according to necessity,
the communication-apparatus-attribute-information acquiring unit acquires, concerning the slave station, an input data amount and an output data amount, which are maximum data amounts that can be processed by the slave station, from the communication apparatus peculiar information and acquires, concerning the communication managing apparatus, an input throughput and an output throughput, which are maximum throughputs in the communication managing apparatus, from the communication apparatus peculiar information, and
the performance estimating unit calculates a communication management apparatus hold time serving as communication performance of the network as a sum of a product of a sum total of the input data amounts of the slave stations and the output throughput of the communication management apparatus and a product of a total sum of the output data amounts and the input throughput of the communication management apparatus.

6. The network performance estimating apparatus according to claim 1, wherein
the communication apparatuses include a communication managing apparatus configured to manage communication of the network in cyclic communication, a slave station configured to receive data from the communication managing apparatus and perform transmission of data when the slave station receives the token frame and obtains a transmission right, and a switching hub configured to perform connection between the communication managing apparatus and the slave station or a plurality of the slave stations and provided according to necessity,
the network-configuration depicting unit stores, in the communication-apparatus-peculiar-information storing unit, when a communication apparatus is the slave station, a set input data amount and a set output data amount, which are data amounts input by a user and processed by the communication apparatus, as the attribute information in addition to peculiar information for each communication apparatus name and apparatus type,
the communication-apparatus-attribute-information acquiring unit acquires, concerning the slave station, a token hold time, which is a time for holding the token frame, and an input data amount and an output data amount, which are maximum data amounts that can be processed by the slave station, from the communication apparatus peculiar information and acquires, concerning the switching hub, a delay time from the communication apparatus peculiar information, and the performance estimating unit calculates a token circulation time serving as communication performance of the network according to a sum of the token hold time corrected with the set input data amounts and the set output data amounts added up concerning the slave stations and a product of the delay time of the switching hub and a number of times the token frame passes the switching hub calculated from the token circulation order.

7. The network performance estimating apparatus according to claim 6, further comprising a network information storing unit configured to store information, wherein
the network-configuration depicting unit further stores, in the network information storing unit, concerning the designed network, as system information, transmission speed of a system input by the user, and
when attribute information corresponding to the switching hub is absent in the communication apparatus peculiar information, the performance estimating unit calculates the delay time of the switching hub in the token circulation order as a value obtained by dividing, by transmission speed of the system, a sum of the set output data amount of the slave station arranged immediately before the hub in the token circulation order and the token frame.

8. The network performance estimating apparatus according to claim 1, further comprising:
a communication unit configured to perform communication with an actually-constructed network; and
a network-configuration comparing unit configured to compare configurations of the designed network and the actually-constructed network using the network configuration information and network connection information indicating a connection state among ports of the communication apparatuses in the network acquired from a communication managing apparatus in the actually-constructed network via the communication unit and extract, when a section of the actually-constructed network is different from a corresponding section of the designed network, the section of the actually-constructed network different from the corresponding section of the designed network.

9. The network performance estimating apparatus according to claim 8, wherein
the network connection information specifies, from the communication managing apparatus, with a media access control (MAC) address and port information, a connection state between two communication apparatuses included in the actually-constructed network, and
the network-configuration comparing unit further acquires, from the communication managing apparatus, apparatus information in which peculiar information for each apparatus type of the communication apparatuses included in the actually-constructed network and the MAC address are associated with each other, generates, using the network connection information and the apparatus information, real machine connection relation information in which a connection state of the communication apparatuses in the actually-constructed network is specified by the peculiar information for the each apparatus type and the port information, generates, using the network configuration information and the attribute information, design data connection relation information in which a connection state of the communication apparatuses in the designed network is specified by the peculiar information for the each apparatus type and the port information, compares the real machine connection relation information and the design data connection relation information, and performs comparison of configurations of the actually-constructed network and the designed network.

10. A network performance estimating method for estimating, from a network configuration designed by a user, communication performance of a designed network corresponding to the network configuration, the network performance estimating method comprising:
generating, from the designed network by connecting ports of a plurality of communication apparatuses with wires, network configuration information indicating a connection relation of the ports among the communication apparatuses;
storing, concerning the communication apparatuses in the designed network, as attribute information, apparatus identification information including peculiar information for each communication apparatus name and apparatus type input by the user;
acquiring, concerning the communication apparatuses in the attribute information, communication performance of the communication apparatuses specified by the apparatus identification information from communication apparatus peculiar information in which the peculiar information and communication performance for each apparatus type are stored in association with each other concerning the communication apparatuses;
determining, from the network configuration information, token circulation order indicating order of the communication apparatuses in which a token frame is circulated in the designed network; and
calculating communication performance of the designed network using the token circulation order and the communication performance of the communication apparatuses.

11. A network configuration checking method for checking a difference in configurations of a network designed by a user and a network actually constructed by the user, the network configuration checking method comprising:
generating, from the network designed by the user by connecting ports of a plurality of communication apparatus models with wires, network configuration information indicating a connection relation of the ports among the communication apparatus models;
storing, concerning the communication apparatus models in the designed network, as attribute information, apparatus identification information including peculiar information for each communication apparatus name and apparatus type of the communication apparatus models input by the user;
acquiring, concerning the communication apparatus models in the attribute information, communication performance of the communication apparatuses specified by the apparatus identification information from communication apparatus peculiar information in which the peculiar information and communication performance for each apparatus type are stored in association with each other concerning the communication apparatuses;
determining, from the network configuration information, token circulation order indicating order of the communication apparatus models in which a token frame is circulated in the designed network;
calculating communication performance of the designed network using the token circulation order and the communication performance of the communication apparatuses;
acquiring, from a communication managing apparatus in the network actually constructed by the user, network connection information indicating a connection state among the ports of the communication apparatuses in the network actually constructed by the user; and comparing configurations of the designed network and the network actually constructed by the user using the network connection information and the network configuration information and extracting, when a section of the network actually constructed by the user is different from a corresponding section of the designed network, the section of the network actually constructed by the user different from the corresponding section of the designed network.

\* \* \* \* \*